US008548847B2

(12) United States Patent
Roberts et al.

(10) Patent No.: US 8,548,847 B2
(45) Date of Patent: Oct. 1, 2013

(54) METHOD AND SYSTEM FOR GENERATING REAL-TIME DIRECTIONS ASSOCIATED WITH PRODUCT PROMOTIONS

(75) Inventors: Gregory B. Roberts, Alpharetta, GA (US); Scott Wills, Mountain View, CA (US)

(73) Assignee: Catalina Marketing Corporation, St. Peterburg, FL (US)

( * ) Notice: Subject to any disclaimer, the term of this patent is extended or adjusted under 35 U.S.C. 154(b) by 786 days.

(21) Appl. No.: 11/143,705

(22) Filed: Jun. 3, 2005

(65) Prior Publication Data
US 2006/0089878 A1 Apr. 27, 2006

Related U.S. Application Data

(63) Continuation of application No. 10/937,312, filed on Sep. 10, 2004, now abandoned.

(60) Provisional application No. 60/501,850, filed on Sep. 11, 2003.

(51) Int. Cl.
*G06Q 30/00* (2012.01)
(52) U.S. Cl.
USPC .......................................... 705/14.1
(58) Field of Classification Search
USPC ..................................... 705/14, 14.1
See application file for complete search history.

(56) References Cited

U.S. PATENT DOCUMENTS

| 3,632,995 | A | 1/1972 | Wilson | |
| 4,554,446 | A | 11/1985 | Murphy et al. | 235/487 |
| 4,674,041 | A | 6/1987 | Lemon et al. | 364/401 |
| 5,004,270 | A | 4/1991 | Schaul et al. | 283/48.1 |
| 5,176,224 | A | 1/1993 | Spector | 186/52 |
| 5,185,695 | A | 2/1993 | Pruchnicki | 364/401 |
| 5,214,793 | A | 5/1993 | Conway et al. | 455/49.1 |
| 5,249,044 | A | 9/1993 | Von Kohorn | 358/86 |
| 5,285,278 | A | 2/1994 | Holman | 358/142 |
| 5,287,181 | A | 2/1994 | Holman | 348/473 |
| 5,308,120 | A | 5/1994 | Thompson | 283/70 |
| 5,353,218 | A | 10/1994 | De Lapa et al. | 364/401 |
| 5,501,491 | A | 3/1996 | Thompson | 283/70 |
| 5,627,549 | A | 5/1997 | Park | 342/357 |
| 5,684,859 | A | 11/1997 | Chanroo et al. | 379/58 |
| 5,822,735 | A | 10/1998 | De Lapa et al. | 705/14 |
| 5,844,221 | A | 12/1998 | Madigan, Jr. et al. | 235/383 |
| 5,845,259 | A | 12/1998 | West et al. | 705/14 |

(Continued)

OTHER PUBLICATIONS

Newcomb, Kevin, "Googie Seeks Patent for Targeting Ads on Wi-Fi Hotspots", *ClickZ*, Mar. 24, 2006, printed from <http://www.clickz.com/3593971>, 1 page.

*Primary Examiner* — Daniel Lastra
(74) *Attorney, Agent, or Firm* — Pillsbury Winthrop Shaw Pittman LLP

(57) ABSTRACT

A method and system for generating customized incentives involving electronic distribution of coupons to remote personal computers based on proximity of the computer to a retail center are disclosed. A repository, such as an online service provider or a web site on the Internet, stores packages of incentive data for downloading automatically or on demand to a user's computer. A plurality of data fields is used to associate a user's location with a specific incentive. The incentive data corresponds to remote user computers in a predetermined geographic area. Means for identifying remote user computers in a predetermined geographic area and means for providing direction data, such as maps, etc. to the remote user computer are disclosed.

6 Claims, 17 Drawing Sheets

(56) References Cited

U.S. PATENT DOCUMENTS

| | | | |
|---|---|---|---|
| 5,852,775 A | 12/1998 | Hidary | 455/404 |
| 5,855,007 A | 12/1998 | Jovicic et al. | 705/14 |
| 5,865,470 A | 2/1999 | Thompson | 283/70 |
| 5,969,678 A | 10/1999 | Stewart | 342/457 |
| 6,014,090 A | 1/2000 | Rosen et al. | 340/905 |
| 6,041,308 A | 3/2000 | Walker et al. | 705/14 |
| 6,571,279 B1* | 5/2003 | Herz et al. | 709/217 |
| 6,647,269 B2* | 11/2003 | Hendrey et al. | 455/456.3 |
| 7,376,591 B2 | 5/2008 | Owens | 705/26 |
| 2001/0051901 A1 | 12/2001 | Hager et al. | 705/26 |
| 2002/0042819 A1 | 4/2002 | Reichert et al. | 709/217 |
| 2002/0087384 A1* | 7/2002 | Neifeld | 705/10 |
| 2002/0095340 A1 | 7/2002 | Vermande | 705/14 |
| 2002/0165967 A1 | 11/2002 | Morgan | 709/227 |
| 2002/0194069 A1* | 12/2002 | Thakur et al. | 705/14 |
| 2003/0004802 A1* | 1/2003 | Callegari | 705/14 |
| 2003/0088461 A1 | 5/2003 | Christensen | 705/14 |
| 2003/0171984 A1 | 9/2003 | Wodka et al. | 705/14 |
| 2004/0056101 A1 | 3/2004 | Barkan et al. | 235/472.03 |
| 2004/0110515 A1* | 6/2004 | Blumberg et al. | 455/456.1 |
| 2004/0249712 A1 | 12/2004 | Brown et al. | 705/14 |
| 2005/0075932 A1 | 4/2005 | Mankoff | 705/14 |
| 2005/0209921 A1 | 9/2005 | Roberts et al. | 705/14 |
| 2005/0216336 A1 | 9/2005 | Roberts et al. | 705/14 |
| 2005/0216337 A1 | 9/2005 | Roberts et al. | 705/14 |
| 2005/0222905 A1 | 10/2005 | Wills | 705/14 |
| 2005/0222910 A1 | 10/2005 | Wills | 705/22 |
| 2005/0228719 A1 | 10/2005 | Roberts et al. | 705/14 |
| 2006/0059044 A1 | 3/2006 | Chan et al. | 705/14 |
| 2006/0116924 A1 | 6/2006 | Angles et al. | 705/14 |
| 2007/0118426 A1 | 5/2007 | Barnes, Jr. | 705/14 |
| 2007/0174259 A1 | 7/2007 | Amjadi | 707/3 |
| 2007/0204025 A1 | 8/2007 | Cox et al. | 709/223 |
| 2008/0140509 A1 | 6/2008 | Amjadi | 705/10 |

* cited by examiner

EXEMPLARY DATA TABLE

| PRODUCT | STORE | n | $L_n$ | $P_{Rn}$ |
|---------|-------|---|-------|----------|
| X | A | 1 | 2 MILES | -0% |
| X | A | 2 | 4 MILES | -5% |
| X | A | 3 | 6 MILES | -10% |
| X | A | 4 | 8 MILES | -15% |
| X | A | 5 | 10 MILES | -20% |

FIG. 18

METHOD AND SYSTEM FOR GENERATING REAL-TIME DIRECTIONS ASSOCIATED WITH PRODUCT PROMOTIONS

CROSS REFERENCE TO RELATED APPLICATIONS

This application is a continuation of U.S. patent application Ser. No. 10/937,312, filed Sep. 10, 2004 now abandoned, which claims priority to U.S. Provisional Patent Application Ser. No. 60/501,850, filed Sep. 11, 2003. This application is related to the following applications: "Method and System for Generating Intelligent Electronic Banners Based on User Information", U.S. patent application Ser. No. 10/937,305, filed Sep. 10, 2004; "Proximity-Based Method and System for Generating Customized Incentives", U.S. patent application Ser. No. 10/937,355, filed Sep. 10, 2004; "Method and System for Electronic Distribution of Incentives Having Real-Time Consumer-Based Directions", U.S. patent application Ser. No. 10/937,504, filed Sep. 10, 2004; "Method and System for Electronic Delivery of Incentive Information Based on User Proximity", U.S. patent application Ser. No. 10/937,503, filed Sep. 10, 2004; "Method and System for Managing Inventory and Promotions Campaign Based on Redemption Data", U.S. patent application Ser. No. 10/937,505, filed Sep. 10, 2004; and "Method and System for Presenting Banners Having Direct Link to user Profile Information", U.S. patent application Ser. No. 10/937,367, filed Sep. 10, 2004.

FIELD OF THE INVENTION

The invention relates to the electronic distribution of incentives, such as secure money-saving or discount coupons and other marketing incentives, for consumers within a particular geographic area or proximity to a point of sale, and/or for consumers within a particular proximity of a competitor or a certain number of competitors. Further, the present invention relates to means for providing consumers with directions, maps and other travel information to assist consumers in reaching a destination for redemption of incentives.

BACKGROUND OF THE INVENTION

Millions of consumers regularly use product redemption coupons and realize substantial savings as a result. Significant time is spent clipping and sorting coupons, discarding expired coupons and organizing current coupons for use on shopping trips. Conventional coupon distribution results in significant wasted time due to consumers' attempts to manage their coupon use.

Coupons are delivered to consumers through a variety of media such as, for example, free standing inserts (FSIs), in-store shelf coupon dispensers, check-out coupons (generally issued based on the customer's current purchase), register receipt coupons, in-product coupons, instant peel-off on-product coupons, direct mail coupons, and/or other delivery media. In addition to manufacturers' coupons, consumers use retail store coupons, such as those issued by large retail chains on a weekly basis. Some consumers use coupons on a fairly random basis. These consumers tend not to keep coupons for future use, but will review coupons available just prior to shopping to see if any of them cover products they plan to buy or if there are any for new or improved products of interest.

More organized coupon users maintain some form of storage system to keep coupons for future use. These consumers often clip coupons regularly from all available sources, and often have coupon filing systems by product category. They will also review their coupons regularly, discarding unused coupons which have expired.

For most consumers, attempts to maintain an organized coupon file often fails. The "bother" and time required to maintained organized coupon files often results in neglect of those files, even though diligent shoppers know that a consistent significant savings is easily achievable using coupons.

The notion of issuing product redemption coupons to consumers was an innovative idea to entice consumers to try new products in the hope that, after the first try of a new product at a coupon discounted price, they would become repeat customers at the regular price. Coupons are effective tools used in launching new products. Manufacturers also find coupons can shore up flagging sales, help reduce excess inventory or win back consumers' brand loyalty, and so coupons for existing products have become customary, so much so that today's consumers have come to expect coupons. Often, coupon price incentives significantly reduce brand loyalty, and manufacturers must issue more coupons than desired to maintain market share. Market share also has been impacted by an increase in the number and variety of competing "no-name" store brands. The competitive nature of the retail industry does not allow manufacturers to reduce coupon distribution, and in some market sectors, such as cereals, the majority of purchases are made with coupons.

Attempts have been made to meet the needs of the coupon industry and the consumer. For example, attempts have included television-based coupon reception system wherein coupon information is transmitted along with program information to a broadcast audience, electronic paperless coupon system where coupon signs are placed near the related item and the discount is automatically applied at the point of sale, kiosk type printer stations located at a retail store linked to the manufacturer(s) in order to obtain specific coupon information, and/or other attempts. While these aforementioned attempts at providing couponing systems are useful in their own right, they fail to provide for a secure and interactive coupon generation system in which the user can request, select, store, manipulate and print coupons as desired, in which user-specific information such as demographic data and data representative of those coupons so requested, selected, printed and actually used may be provided back to the coupon issuer and distributor for more efficient coupon targeting in subsequent coupon issuance and distribution.

Further, the aforementioned attempts at providing coupon systems fail to provide coupons or promotions which are customized according to user-specific information, such as user demographic data, including, for example, location data, proximity data, competitor data, time data and/or date data. Thus, prior attempts do not provide electronic systems or methods which allow a marketer of a product to customize a promotion in such a way as to maximize the value of the promotion to both the marketer of the product and a consumer of the product. In particular, the prior attempts do not allow a promotion which is customized according to the proximity of a consumer from a point of sale and which factors into consideration the proximity of the consumer to a competitor or competitors. Further, prior attempts do not address means for providing directions or guidance to assist consumers in reaching a retail center for redeeming incentives.

It is therefore an object of the present invention to provide such a coupon distribution system which overcomes the aforementioned problems and shortcomings of the above-described references.

SUMMARY OF THE INVENTION

In accordance with these and other objects, provided is a system for distributing and generating at a remote site product redemption coupons comprising a centrally located repository of electronically stored product redemption incentive data, transmission means operatively associated with said centrally located repository for providing data communication between said repository and a plurality of remote user computers, and a remote user computer operatively associated with said transmission means. The remote user computer in the present invention comprises interface means for providing user interaction with the centrally located repository, a memory, and a incentive data management program. The incentive data management program is implemented by the computer for requesting incentive data from the centrally located repository, for storing in the memory incentive data transmitted from the centrally located repository, and for generating printable incentive data from the stored incentive data. The remote user computer also comprises a coupon output buffer operatively associated with the data management program for storing the printable incentive data generated by said incentive data management program.

The present invention additionally comprises a printer for printing product redemption coupons from the printable incentive data stored in the coupon output buffer. Alternatively, the system may enable the user to transmit electronically the printable incentive data from the coupon output buffer to the centrally located repository or directly to the retailer for electronic coupon redemption.

As a result of the present invention, a user of a remote user computer is able to request incentive data to be transmitted from said centrally located repository, and the user is able to instruct his computer to print or electronically transfer product redemption coupons generated from the transmitted incentive data. In particular, the user's computer assembles product redemption coupons for printing by using two data components; (1) fixed incentive data which is transmitted to the user's computer during an initialization or "sign-up" process and which remains stored on the user's computer for subsequent coupon generation, and (2) variable incentive data which is transmitted to the user's computer whenever the user requests incentive data from the repository. Further, a coupon issuer, coupon distributor or online server may transmit incentive data from the repository to the user's computer as part of a promotion. The user may be targeted based upon proximity to a retail center or a defined geographic area and/or proximity to competitors. Incentive data may be automatically downloaded when the user accesses the online server or at some other specified time. In addition, the incentive data may be selectively transmitted by any means based upon previous inputs by the user. For example, the user could request that only incentive data related to food based items be offered and that all such incentive data be automatically downloaded or otherwise transmitted or made available to the user's computer, without limitation.

Additionally, the incentive data management program of the present invention operates in conjunction with the remote computer to allow the user to select and store certain desired incentive data from the incentive data transmitted by the centrally located repository and print coupons as selected. The incentive data management program also allows the user to generate a shopping list which is correlated to the coupons printed for subsequent redemption.

In the present invention, the data exchange capabilities provided by the transmission medium between the remote computer and the central repository allow the automatic transfer of valuable information from the remote computer to the central repository and, ultimately, to the coupon distributing and issuing centers. Information related to the coupons selected and printed can be supplied to the coupon distributors and issuers, which can also use information obtained from the various retail stores as to which coupons were actually redeemed in order to more intelligently market subsequent coupons and target coupon issuance in a more cost effective manner.

The data exchange capabilities are further advantageously utilized in the present invention to allow, via the central repository, the updating of incentive data stored in the user's remote computer without required interaction from the user if the user is online. In particular, the central repository can delete expired coupons from the remote computer's incentive database and can vary the amount of redemption value of a non-expired coupon if so desired. The capability for the updating and deleting of coupons within a user's computer is programmed in the user's computer such that no further interaction with the central repository is required for such coupons to be deleted or updated.

The present invention provides for secure coupon generation by allowing the printing of a particular coupon only once. Further, and quite importantly, the present invention provides for the printing on each coupon of certain user-specific data, thus making each coupon printed unique. Thus, two different users with access to printing a particular coupon will each print coupons with the same product, discount, and expiration date data, yet each will be unique since printed thereon will be user-specific data, preferably in the form of a user-specific bar code. Thus, any attempts to duplicate via photocopying techniques any particular coupon will be discouraged since the coupon redemption center will detect when a particular coupon has been redeemed, will identify the user who redeems a particular coupon, and will disallow any attempt at redemption of a second coupon with identical product and user-specific data.

BRIEF DESCRIPTION OF THE DRAWINGS

FIG. 18 is an exemplary data table illustrating proximity-based customization of incentives according to the general formula of the invention in another embodiment of the invention.

DETAILED DESCRIPTION OF PREFERRED EMBODIMENTS

Figure 1:
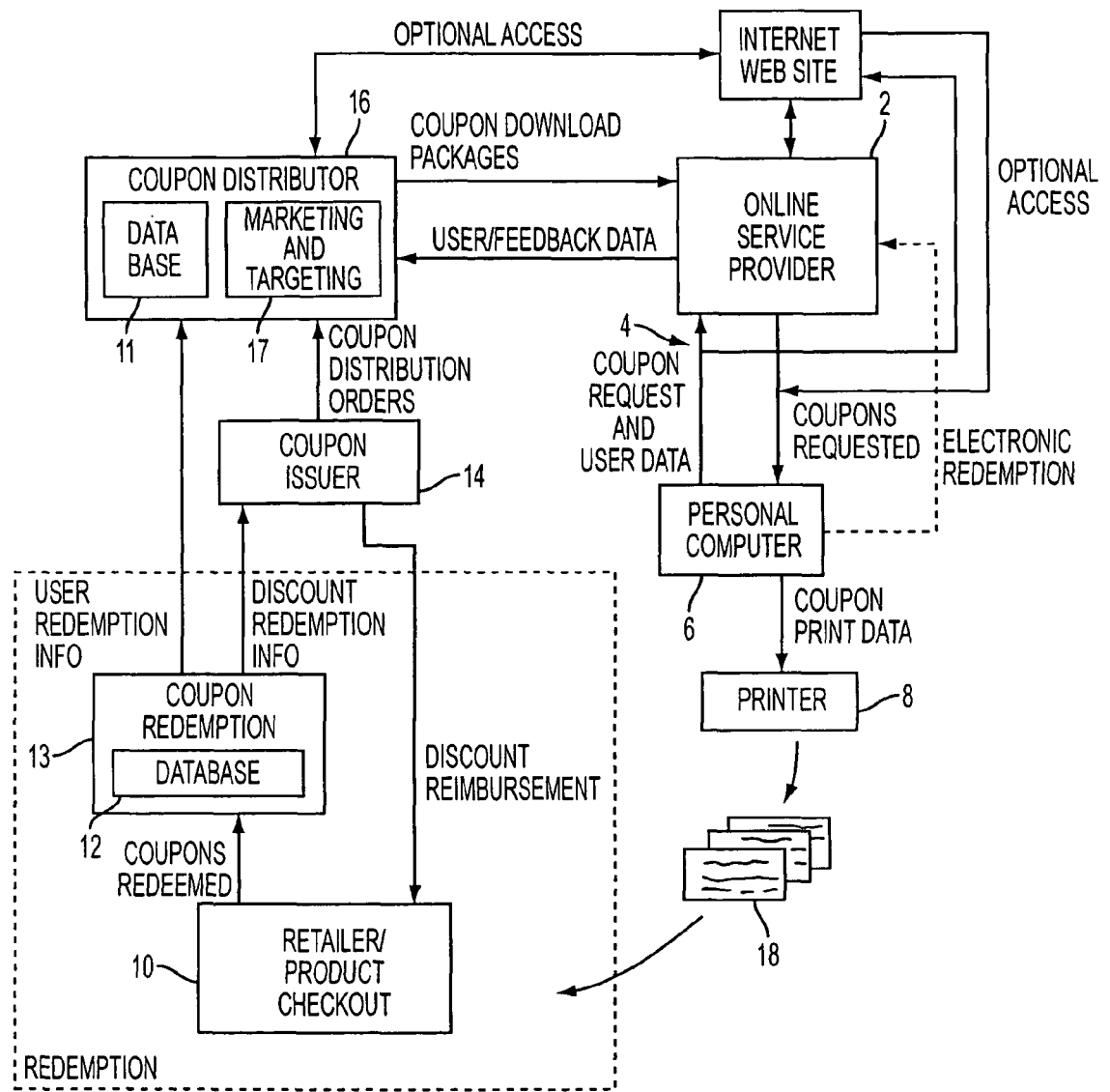
FIG. 1 is a schematic block diagram of the system of the preferred embodiment for the electronic distribution of coupons.
Figure 8:
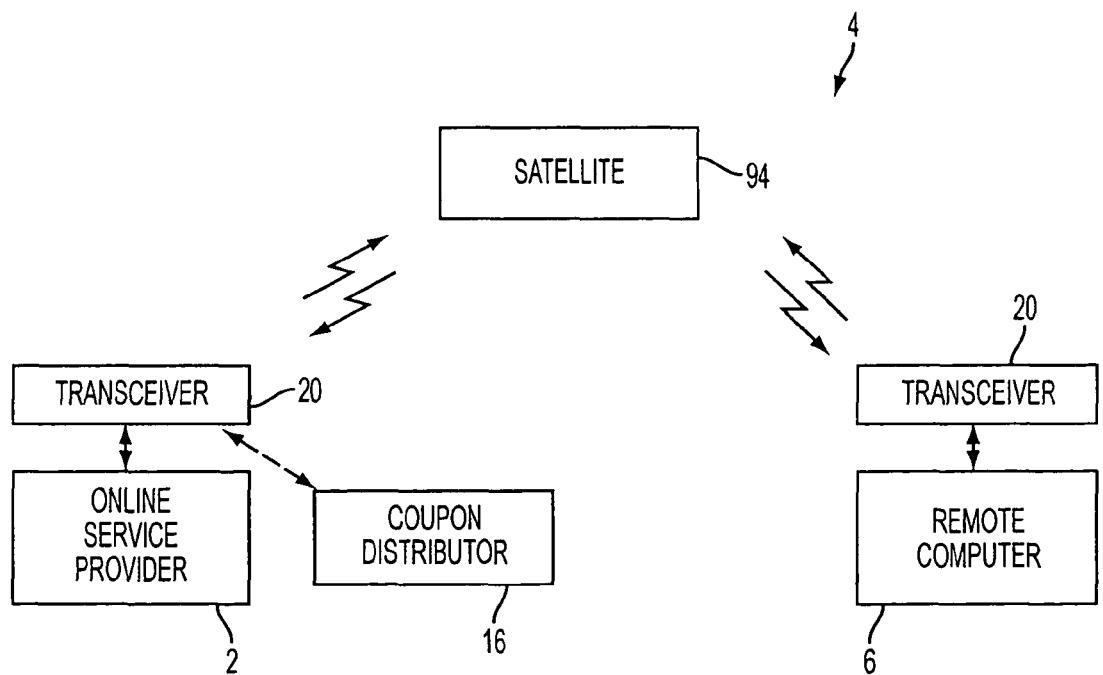
FIG. 8 is a block diagram of an alternative embodiment of the present invention in which data is transmitted between the central repository and personal computer by satellite.
Figure 9:
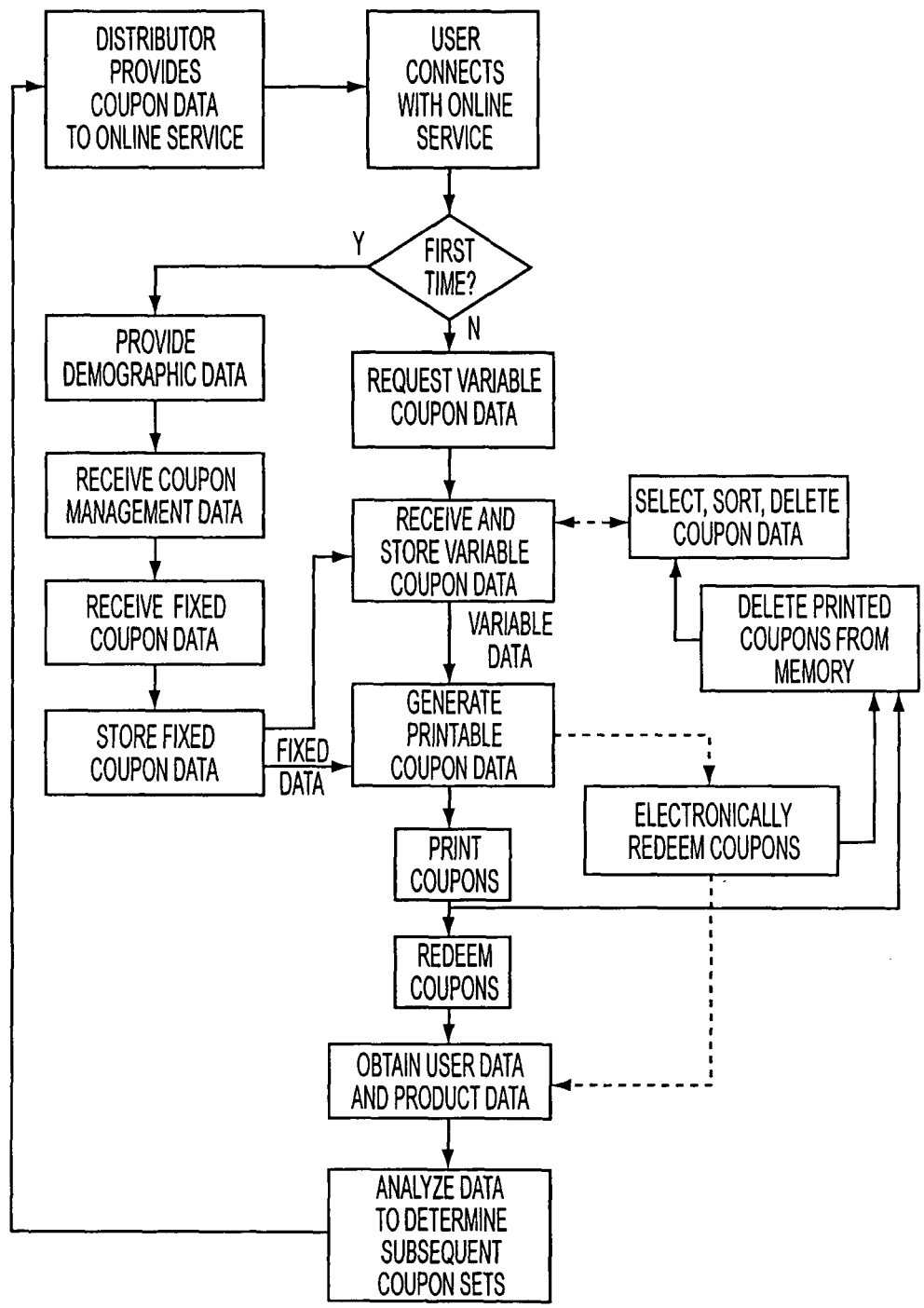
FIG. 9 is a flowchart of the operation of the present invention.

Referring to the system block diagram of FIG. 1 and the flowchart of FIG. 9, the electronic coupon distribution system of the preferred embodiment comprises a repository of electronically stored incentive data, which in one embodiment is an online service provider 2. The repository is optionally a centrally located repository. The term online service provider refers herein to any computer-based information service provider which is accessible by a remote personal computer user via a communications data link such as the public switched telephone network (PSTN) or the like, such as PRODIGY, COMPUSERVE, or AMERICA ONLINE. In addition, it is contemplated that the electronic incentive data distribution may be carried out by connection to any readily accessible Internet site such as the World Wide Web. Referring to FIG. 8, it is further contemplated that electronic coupon distribution may also be carried out via digital satellite communication links, thus avoiding the need for hardwired (i.e., PSTN) connectivity between the repository and the remote user computer. Thus, any centrally located computer system which is accessible to the public by any transmission means is contemplated as being within the scope of this invention. Further, it is contemplated that the electronic incentive data distribution may include GPS transmission. For example, details and use of GPS transmission to determine the location of a GPS receiver corresponding to a remote user computer are well known to persons of ordinary skill in the art.

As used herein, the term "user" denotes an individual user or a household of users linked through one account. The term "incentive" as used herein, is any offer that causes an individual to take a certain action. As used herein, the term "product checkout means" denotes any device for processing sales transactions, such as a cash register, a bar code reader, a credit card machine or a debit card machine, without limitation.

The online service provider 2 has stored in its database 40 (see FIGS. 6 and 10) various packages of electronic incentive data, the content of which will be further described below. The electronic incentive data is provided, by a coupon distributor 16 or coupon issuer 14, by any various means such as electronic transmission via the PSTN or satellite data exchange. The online service provider also stores in a demographic data file 42 user-specific data, including coupons selected data, coupons deleted data, coupons printed data, user demographics, including user location, as will be described below, for subsequent transmission to a coupon distributor 16 or a coupon issuer 14. The coupon distributor 16 or coupon issuer 14 will utilize the user-specific data and coupon redemption data in compiling subsequent coupon packages targeted specifically at certain user categories, including users located within a predetermined geographic area or within a predetermined proximity range of a retail center, without limitation.

The online service provider 2 optionally stores in its database data corresponding to the location of a retail center 10 or a plurality of retail centers, as well as data corresponding to the location of a competitor-retail centers or a plurality of competitor-retail centers. The term "competitor-retail center" refers to any particular place of business operated by a competitor of the coupon issuer or at which a consumer may purchase and/or receive the product other than a place of business operated by the coupon issuer. As used herein, the term "product" denotes a good, a service, or any combination thereof, without limitation. The location of each retail center or competitor-retail center may be represented by any such identifying means, including local street address, city, township, county, state, country, zip-code, telephone area-code, telephone prefix, zone or region, and the like.

Figure 2:
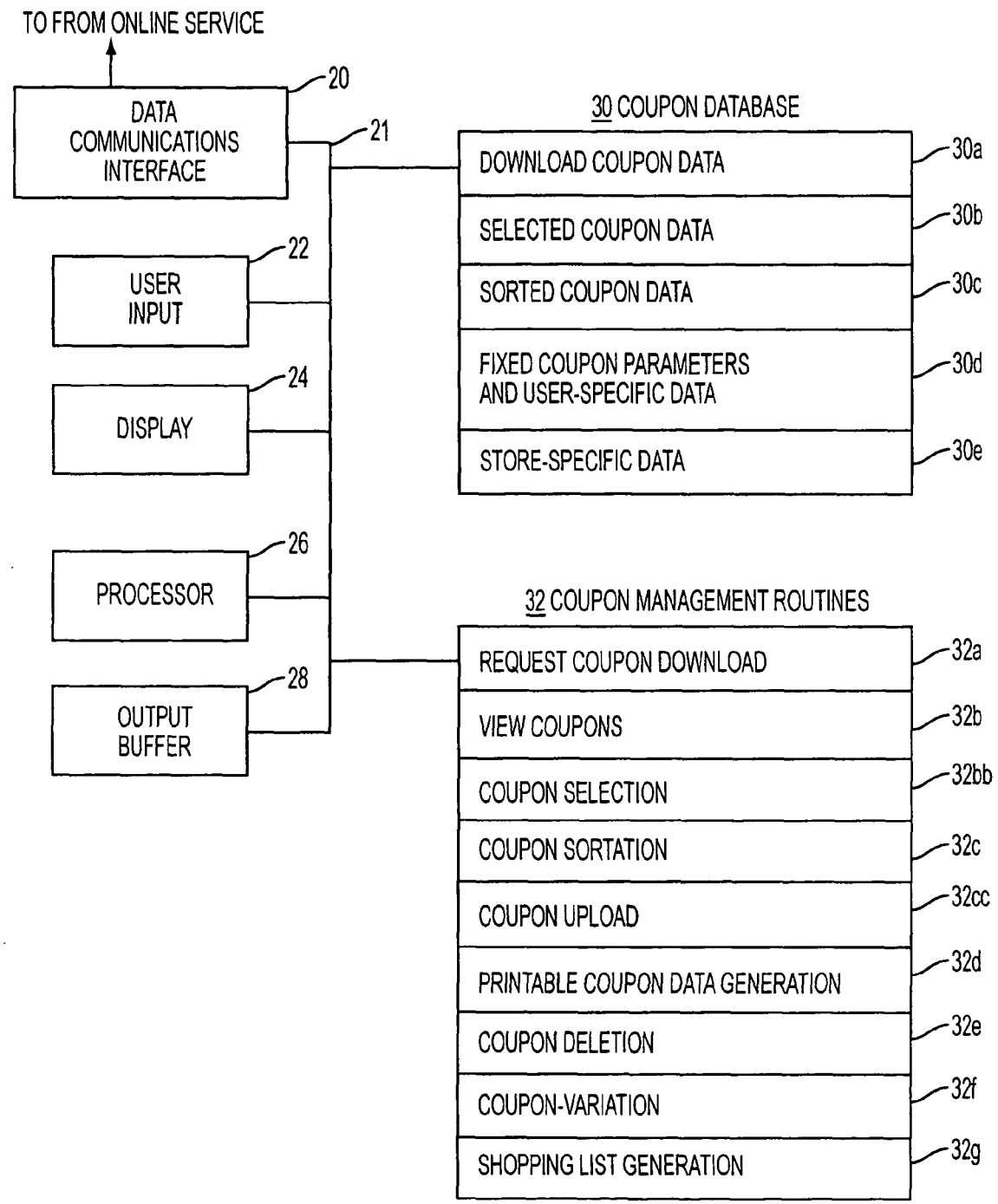
FIG. 2 is a detailed block diagram of the remote personal computer of FIG. 1 configured in accordance with the present invention.

The online service provider 2 is connected with the data link 4 and is thus accessible by any remote personal computer 6 having a data communications interface 20 such as a modem (see FIG. 2). The online service provider communicates with the personal computer 6 in order to transmit requested incentive data, and also in order to receive coupon requests and the user-specific data mentioned above.

The remote personal computer 6 has connected thereto a printer 8, which may be any type of computer printer capable of printing graphics. The printer 8 is instructed by the incentive data management routines 32 stored in the computer 6 in order to print printed coupons 18, as will be described in detail below.

The printed coupons 18 are used in the normal fashion by a consumer when shopping at a desired retail center 10. That is, the coupons 18 are presented to a product checkout station 11 along with the associated products for purchase, and the discount amount shown on the coupon 18 is credited to the consumer at the point of sale. The redeemed coupons 18 are transmitted to a coupon redemption center 13 where they are electronically read, and user-specific data is stored in a coupon redemption database 12.

Figure 5:
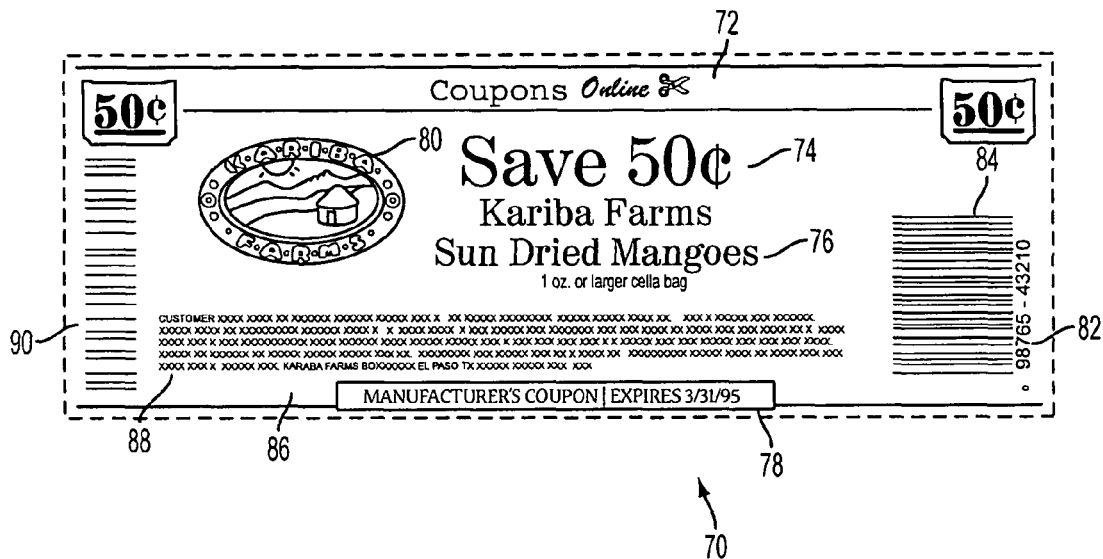
FIG. 5 is a diagram of a printed coupon resulting from the electronic distribution in accordance with the present invention.

In addition to the usual coupon information found in prior art coupons (e.g., redemption amount, company and product name, expiration date, etc.), the coupons 18 of the preferred embodiment of the present invention contain user-specific data in the form of a unique user bar code 90, as shown graphically in FIG. 5. The user bar code 90 is encoded with user-specific information such as the user name and/or other unique identification criteria such as a social security number or online service address. This information renders each printed coupon 18 unique, since an otherwise similar coupon presented by a different consumer will comprise a different user bar code 90. The use of a unique coupon 18 is but one aspect of the secure nature of the present invention as will be described in detail below.

The coupon information includes customized incentive data, proximity-based customized incentive data and the like. Non-limiting exemplary incentive data includes an advertisement, a WEB page, a promotion, a banner, a coupon, an offer of a gift, an offer of a raffle or contest ticket, an offer of a free product unit or free product units, a discounted product price, a discount applicable to a product purchase or future product purchase, or combinations thereof. Non-limiting exemplary coupons, include a traditional paper coupon offering a discount on a product, a unit or units of data stored in a magnetic strip on a card representing a discount on the product price at a product checkout means, data associated with a user and stored in a buffer at a product checkout means which provides a discount to the user pursuant to completion of a transaction at a product checkout means, without limitation. The incentive data may be customized in various ways, for example, customization according to a user's proximity to a retail center and/or proximity to one or more competitor-retail centers. The incentive data may be in the form of a proximity-based customized coupon.

In one implementation, a first coupon having a first redemption amount for a product is distributed to users in a first predetermined geographic area or within a first predetermined proximity range, and a second coupon having a second redemption amount for the product is distributed to users in a second predetermined geographic area or within a second predetermined proximity range, without limitation. As used herein, the term "predetermined proximity range" refers to a range of values corresponding to a predetermined maximum distance from some object of location associable with a product, such as a point-of-sale (i.e., a retail center) and a predetermined minimum distance from that object of location. In one implementation, the predetermined proximity range represents a proximity to a retail center or store. Non-limiting exemplary objects of location associable with a product include, a retail center, a store, a distribution center, a manufacturing facility, a factory outlet, the site of an event, or a temporary or mobile facility.

Competitor data includes data corresponding to competitor-retail centers, such as location of competitor-retail centers and the number of competitor-retail centers within a predetermined proximity range of a remote user computer. In one implementation of the present invention, competitor data corresponding to a remote user computer is obtained or received and then associated with a predetermined competitor parameter. The predetermined competitor parameter places conditions upon the providing of an incentive to the remote user computer according to the number of competitor-retail centers identified within a predetermined proximity of the remote user computer. The predetermined competitor parameter thus establishes a condition upon the providing of an incentive to the remote user computer. For example, a remote user computer is within a particular proximity range of a retail center which has been designated for a particular incentive offer, however, the incentive offer is not provided to the remote user computer because only one competitor is identified within a predetermined proximity of the user and the parameters of the system had been set to require at least two competitors within the predetermined proximity of the remote user computer specified according to the competitor parameter.

In another implementation of the invention, the user location may be associated with a specific retail center through identification means in any manner, or alternatively, a condition may be placed upon the proximity of the remote user computer to a related-retail center or a plurality of related-retail centers. As used herein, "related-retail center" refers to a retail center defined in any way, including for example, retail centers in common ownership, without limitation. For example, a remote user computer is within a particular proximity range of a retail center which has been designated for a particular incentive offer, however, the incentive offer is not provided to the remote user computer because a related-retail center is identified within a predetermined proximity of the user and the parameters of the system had been set to require exclude providing incentives to remote user computers within a predetermined area of two or more related-retail centers.

The coupon redemption center 13 receives from a number of stores 10 the coupons redeemed, verifies the value of the redeemed coupons, determines the identification of users who redeemed the coupons, and distributes the information read from the coupons 18 to the individual coupon issuer 14 and to the coupon distributor 16. In particular, information regarding the redemption amount and the redeeming retail center 10 is forwarded to the particular coupon issuer 14 named on the coupon 18, which then credits the redeeming retail center 10 with the total amount of discounts given. Of particular value in the present invention is the distribution of user-specific data to the coupon retail center 16, which collates such user information and performs marketing analysis via a marketing analysis means 17 in order to compile subsequent coupon packages targeted specifically at certain user categories. The coupon retail center 16 utilizes the user-specific redemption data along with user-specific demographic data, including user location data, supplied by the online service provider 2 in order to compile subsequent incentive data download packages for use by consumers once again. As used herein, "user location data" refers to data which identifies the geographic location of a remote user computer, such as a local street address, city, township, county, state, country, zip-code, telephone area-code, telephone prefix, zone, region, map coordinates, GPS location identifier and the like, without limitation.

Figure 4A:
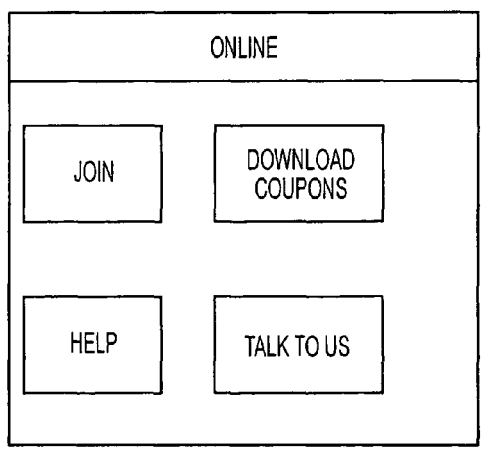
FIGS. 4A and 4B is a pictorial representations of the online and offline display screens, respectively, which are exhibited to a user in the present invention.

An online display screen 60 is shown in FIG. 4a, which is provided to a user on a display 24 of his remote computer 6 whenever he is in online communication with the service provider 2. The online display screen 60 comprises a join service function button 62, a download coupons function button 64, a help function button 66, and an online communications button 68. When the user desires to initially register for the electronic coupon distribution service, he selects the join service function button 62 which initiates a dialog with the online service provider 2 in order to request certain demographic data, including user location data, from the user which will be used to target specific incentive data packages for subsequent downloading. The user has the option of providing the requested information if he so desires. In addition, an offline coupon management program is transmitted electronically to the user's computer 6 for subsequent incentive data requesting, downloading and processing. User location data may also be obtained by any means other than user inputs, such as, for example, by searching an online telephone directory. In this manner inconvenience to the user may be minimized. Such user location data could be subsequently presented to the user for confirmation.

Figure 6:
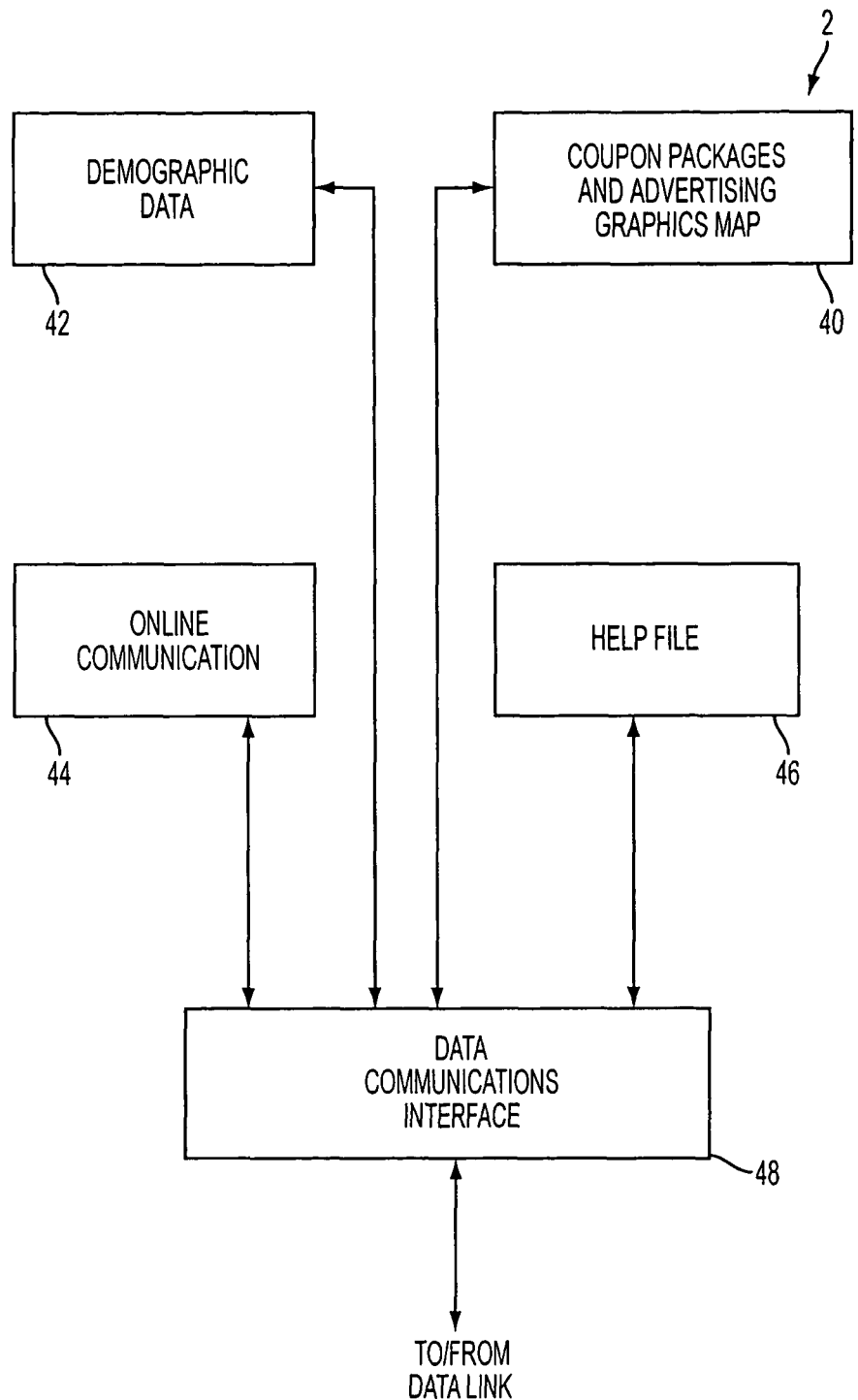
FIG. 6 is a schematic block diagram illustrating the main functional areas serviced by the online service provider of the preferred embodiment system.

FIG. 6 illustrates the functional aspects of the online service provider 2 in the preferred embodiment of the present invention. The main features provided by the online service provider 2 are the coupon packages file 40, the demographic data file 42, the online communications server 44, and the help file 46. Each of the aforementioned features communicates with the user via the data communications interface 48.

The coupon packages file 40 comprises electronic incentive data and other types of advertising materials supplied by the various coupon issuers 14 through the coupon distributor 16. Individual users' incentive data packages are drawn from this file based on demographic data, including user location data, and historic buying profiles stored in the demographic data file 42. Advertisements may consist of graphics, text, recipes, competitions or other inducements or a combination thereof.

After joining the electronic coupon service, the user can order a package of electronic coupons from the online service provider 2 by selecting the download coupon function button 64. When this button is selected, commands are generated and transmitted via the data communications interface 20, through the data link 4, and up to the coupon package file 40 resident at the online service provider 2. The requested incentive data package and associated advertising materials are transmitted by the online service provider 2 to the personal computer 6, where it is stored in the downloaded incentive data file 30*a* in the coupon database 30.

The demographic data file 42 contains data representative of demographic, including location, inquiries presented to a user at the time that the user requests a download of incentive data from the coupon package data file 40, as well as data representative of the users' responses thereto.

The online communication server 44 is accessed by the user selecting the online communication button 68. The online communication server is a bulletin board type file where users can post messages to a coupon distributor or issuer regarding any issue of interest. The message data is transferred to the appropriate destination by the online service provider 2, which also collects the responses thereto and posts them on the online communication server 44, thus allowing the user to fetch the response when logged on at a subsequent time.

By selecting the help function button 66, the help file 46 is used as a means for providing standard help and other useful information to a user.

Referring to FIG. 2, the remote personal computer 6 of the preferred embodiment comprises a data communications interface 20 (such as a modem) for connecting the computer to the data link 4 (such as a PSTN), a user input device 22 such as a keyboard and mouse or other type pointing device, a display 24, and a processor 26, all of which are common to personal computers and are well known in the art. The computer 6 also comprises an output buffer 28, which typically resides in random access memory. The computer 6 is configured to operate in accordance with the present invention via a coupon database file 30 and an offline incentive data management routine file 32 loaded onto a fixed memory such as a hard disk drive. All of these internal components and files are connected to a data bus 21 for communication therebetween in accordance with techniques well known in the art.

The coupon database file 30 is segmented into various sections as shown in the memory map of FIG. 2. The coupon database of the preferred embodiment comprises downloaded incentive data 30*a*, which is the entire incentive data package downloaded from the online service provider 2; selected incentive data 30*b*, which is a subset of the downloaded data and represents specific coupons electronically "clipped" and stored therein; sorted incentive data 30*c*, which is selected incentive data sorted in accordance with a particular set of criteria (e.g., all fruits together, then all dairy products, etc.); fixed coupon parameters and user-specific data 30*d*, which is certain unvarying data used in printing the coupons as will be described in detail below; and store-specific data 30*e*, which includes data fields for predetermined proximity ranges, maximum proximity limitations and competitor parameters, as will be further described below, as well as, information regarding the product arrangement in a certain retail center 10 which will allow the user to prepare a shopping list tailored to the particular store.

Figure 4B:
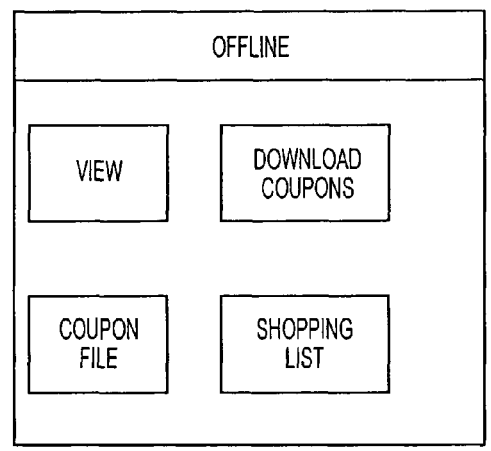

The offline incentive data management routines 32 are executed by the processor 26 in conjunction with the incentive database 30 in order to request, obtain, store, select, sort, and print coupons as desired. The offline coupon data management routines 32 are executed by selecting a desired function button 52, 54, 56, or 58 as shown in the offline display screen 50 in FIG. 4*b*. The offline display screen 50 is shown on the display 24 when the user runs the coupon data management program on his or her personal computer 6. The offline coupon data management routines 32 are executed in an offline fashion; that is, the user does not need to first be in online communication with the service provider 2. If a particular function button 52, 54, 56, or 58 chosen by the user initiates a routine 32 which requires online communication, that routine will initiate, control and terminate an online session with the service provider 2 automatically.

The request coupon download routine 32*a* is executed when the user desires to order a package of electronic coupons from the online service provider 2. This routine is called when the user selects the download coupon function button 54. When this routine is called, commands generated by this routine are transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30*a* in the coupon database 30.

Prior to downloading the requested coupon data package to the computer 6, the demographic data file 42 provides certain demographic, including location, queries to the user in order to obtain valuable information for use in marketing analysis and subsequent coupon package generation. The users' responses to the queries are transmitted to the online service provider 2 and stored in the demographic data file 42 for subsequent processing.

The user may select the view function button 52 in order to view the coupons and advertisements previously downloaded. This selection will call the view coupons routine 32*b*, which will access the downloaded coupon data file 30*a* and present it to the user via the display 24.

While viewing the coupons and advertisement, the user may select a desired coupon for further sorting, storage, printing or deleting and/or shopping list generation by selecting or "clipping" the coupon with the mouse or keyboard input 22. Coupons are clipped by scrolling through related advertisements. In order to avoid the need for clipping, the user may print or delete a desired coupon. The coupons selected in this function are stored for further processing in the selected coupon data file 30*b*.

The coupon file function button 56 enables the user to perform several operations on his selected coupon data file 30*b*. The user may view the coupons selected (from the selected coupon data file 30*b*), and may choose any of them for printing. Further, a sortation option is provided which logically sorts, by category and subcategory, the coupons stored. Thus, the management program automatically places all the dairy coupons together, and may also place all the milk coupons together within the dairy category. This is carried out by the coupon sortation routine 32*c*, and is akin to the manual filing system used in the prior art and will aid the user in viewing his selected but unprinted coupons in an efficient manner. The sorted coupons may be loaded into the sorted coupon data file 30c for subsequent viewing and printing. The user may optionally sort the coupons manually by his own classification.

The shopping list function button 58 calls the shopping list generation routine 32g when selected by the user. This routine will allow the user to generate a list from a menu presented on the screen whichever items the user desires to purchase, and the user can store and/or print this list as desired. The items on the list are compared against coupon data stored in the coupon database 30 and the user is informed of their existence. The user may then print out those coupons along with the shopping list. Alternatively, the user may select certain coupons for printing, and the item associated therewith is automatically placed on the shopping list. Thus, in either fashion, the user's shopping list generation and coupon "clipping" tasks are conveniently merged in a timesaving manner.

The shopping list generation routine 32g may also advantageously use data stored in the store-specific data file 30e in order to prepare a shopping list tailored to an individual retail store. Thus, data regarding the layout of the store, the food items available at the store, and the like, are used by the list generation routine 32g in order to organize the purchase items accordingly. The data stored in the store-specific data file 30e may be obtained by any of several methods; by downloading from the online service provider 2, by inputting via a floppy disk memory supplied by the store, or even manually input by the user. Data for different stores can be kept in the file 30e and the user simply selects the store he intends on using at that particular time. The user may select a standard pre-programmed shopping list, his last generated shopping list, or a blank shopping list from which to commence his shopping list preparation.

The coupon upload routine 32cc is called automatically and without user request whenever user requests a coupon download package from the online service provider 2. A record is kept by the upload routine 32cc indicative of each coupon selected by the user and each coupon printed by the user. This record is sent to the demographic data file 42 in the online service provider 2, and is used for marketing analysis along with data regarding which coupons were actually redeemed, which information is obtained from the manufacturers' redemption agency or center.

Coupons are printed by the printable coupon data generation routine 32d, which is invoked by a user when he selects a print command from the coupon file function 56. This routine obtains data from two sources in the coupon database 30: the fixed coupon parameters and user-specific data file 30d, and the variable coupon data associated with the particular coupon selected for printing.

Figure 3:
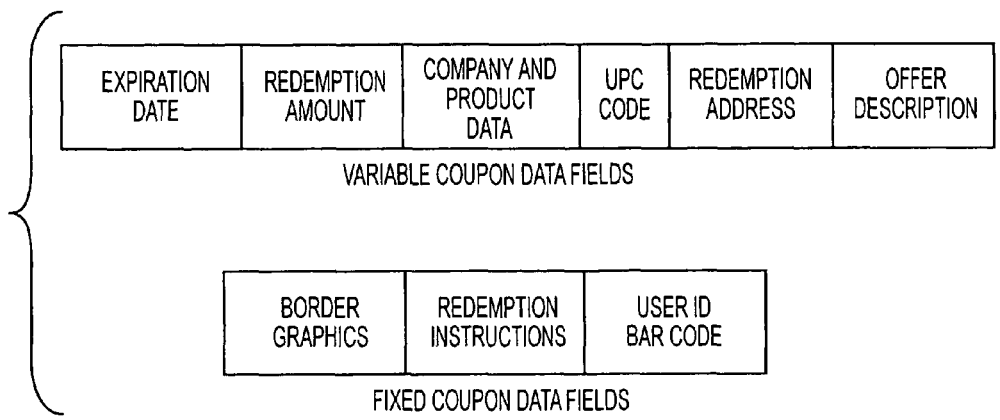
FIG. 3 illustrates exemplary data field formats of the electronic incentive data as implemented in the present invention.

Referring to FIG. 3, the data format of the fixed coupon parameters and user-specific data are set forth and include predefined border graphics which are the same for every coupon printed, redemption instructions, and a user identification bar code number. The user identification bar code number is a unique number assigned to that user, e.g. his social security number or online identification number. This number will be encoded by the printable coupon data generation routine 32d and printed as a bar code 90 on each coupon 18 printed for the particular user. This information will thus be obtained by the coupon redemption center and provided to the coupon distributor 16 for demographic analysis and the like.

The unique user bar code 90 also renders the electronic coupon system of the present invention secure and virtually fraud-proof. Although a user is able to print out a particular coupon 18 only once (to be described in detail below), the coupon issuer 14 could still be defrauded by a user or retailer who might photocopy a printed coupon numerous times and fraudulently and repeatedly present it for redemption. However, in accordance with the present invention, each coupon printed by a user is unique, and the scanning of a coupon presented for redemption will be stored at the coupon redemption center. Thus, the coupon issuer will know if a particular user has redeemed a particular coupon and thus disallow further redemption of a photocopied coupon bearing the same indicia.

Referring again to FIG. 3, the data format of the variable coupon parameters are set forth and include the coupon expiration date, the redemption amount, the company and product information, the UPC code, the redemption address, and the description of the coupon offer.

Thus, the printable coupon data generation routine 32d combines all this information and generates a record indicative of the unique coupon to be printed. This record is temporarily stored in the output buffer 28, where it is subsequently sent to the printer 8 for printing. In the alternative, the coupon may be redeemed electronically by sending the coupon data in the output buffer via the data communications interface 20 back to the online service provider 2. This is especially useful in the "electronic shopping mall" environment now found in many online services. The electronic coupon data could also be routed via the data communications interface 20 to a retail store where the user will be shopping, where the coupon data is held in a buffer pending purchase by the user of the matching product.

As described above, the electronic coupon distribution system of the present invention allows the printing of a particular coupon only once, thus providing for security and guarding against fraudulent redemption. This is accomplished by the coupon deletion routine 32e, which is called whenever a coupon is printed and deletes the coupon from the database 30 or renders it unprintable by setting an appropriate flag. In addition, the coupon deletion routine 32e allows for automatic deletion of expired coupons by periodically checking the expiration date field of each coupon against a real-time clock found in the computer 6. Optionally, the user may voluntarily delete any coupon which is expired if the real-time clock is not set to the correct date. For the user's convenience, the online service provider 2 can check the system clock of the user's computer 6 during a communications session and, if the date is incorrect, can ask the user if he would like the date adjusted automatically.

Since the actual expiration date is always printed as part of the coupon, the function of deleting expired coupon data from the user's computer 6 is for the convenience of the user rather than for security purposes.

The system of the present invention also allows for time-sensitive deletion of certain incentive data from the user computer 6 which is unrelated to the expiration date. That is, certain incentive data may be automatically deleted from the user's computer after, e.g., one month, notwithstanding that the coupon, if printed, might have an expiration date in six months. This feature is included to prompt users who know of the time-sensitive autodeletion to promptly print (and use) coupons rather than risk having them deleted from their database.

The coupon management program also can vary the redemption value of any coupon already downloaded to the user's computer 6 without the need for specific user interaction. A coupon variation routine 32f is called which aids in this task. Again, any time that a user initiates a download of incentive data, the on-line service provider 2 can update redemption amounts for coupons whose issuers have decided to change the discount amount.

Referring to FIG. 5, the secure coupon 70 generated and printed in the preferred embodiment is illustrated in detail. The secure coupon 70 comprises the following fixed components taken from the fixed coupon parameter and user-specific data file 30*d*: border graphics 72, redemption instructions 88, and user identification bar code 90. The secure coupon 70 also comprises the following variable components which change for each coupon selected: expiration date 78, redemption amount 74, description of the offer 76, company and/or product information 80, the item's UPC number 82 and the associated UPC bar code 84, and the redemption address 86.

Figure 10:
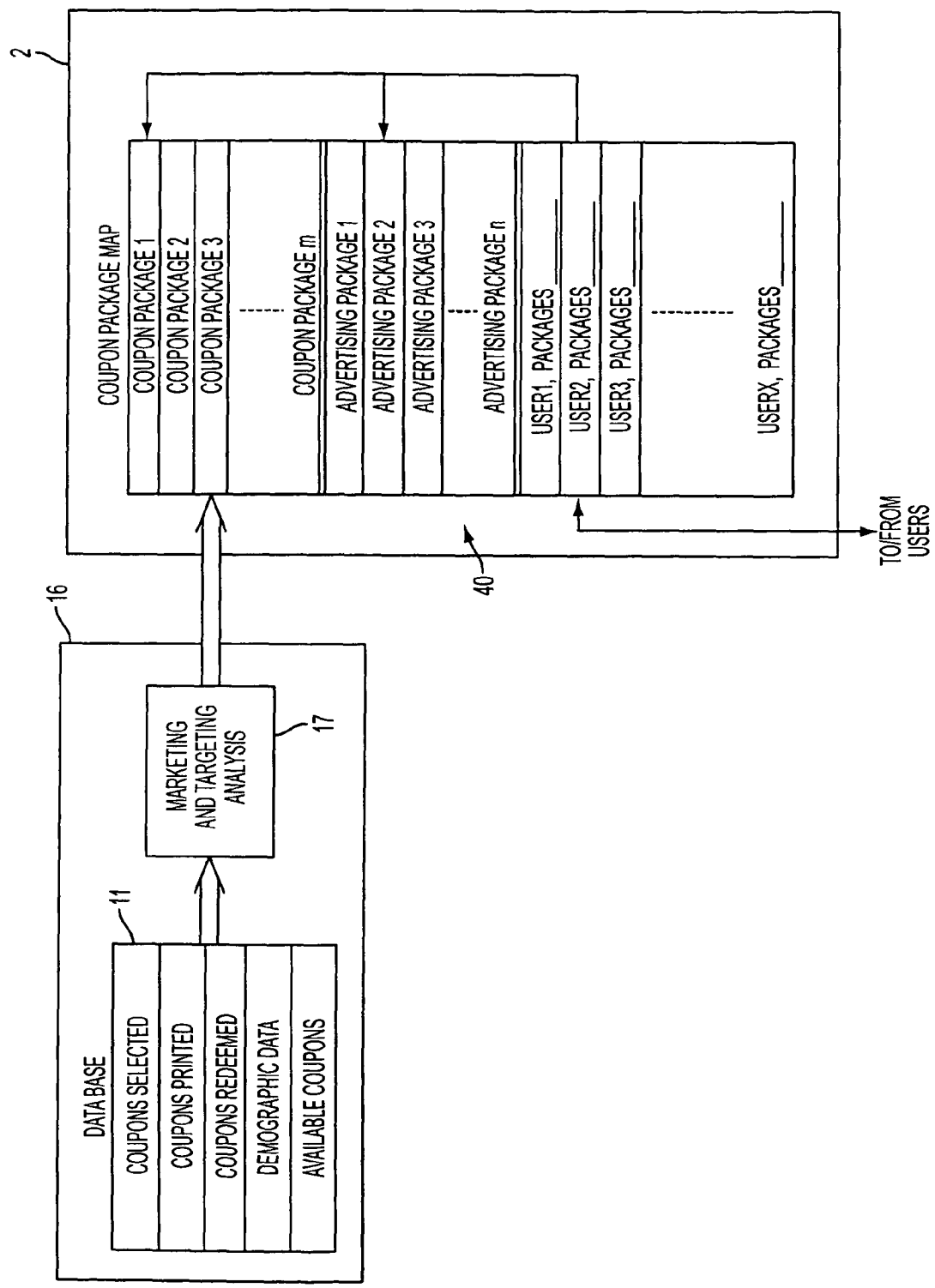
FIG. 10 is a schematic block diagram of the implementation of the incentive data package generation.

Referring to FIG. 10, the generation of coupon data packages by the coupon distributor 16 will be explained. The information collected by the coupon distributor 16 from the online service provider 2 regarding the coupon data selected by the user, the coupon data printed by the user, and the requested demographic information is stored in a database 11. The database 11 also stores information from the coupon redemption center 13 regarding the coupons actually redeemed by the user. The database 11 further stores information regarding all coupons which are made available by the various coupon issuers 14 from which it will generate coupon data packages for subsequent downloading to users.

The information stored in the database 11 is input to the marketing and targeting analysis means 17, which carries out the function of analyzing the aforementioned information in a manner known in the art to arrive at different coupon packages. That is, it may be determined by the analysis means 17 that users with dogs in their household (which is known by the demographic responses) will get a certain package comprising dog food coupons. It may be further determined that users who select, print and redeem dog food coupons of Brand X will get coupons issued by Brand Y, or will get only low value coupons since they are already dog food coupon users, etc. That is, depending on the marketing and targeting criteria and objectives, the analysis means will generate coupon packages as desired. Also, a promotion may be customized based on a combination of proximity ranges, competitor parameters and marketing and targeting criteria and objectives.

In addition, coupon packages may be customized according to marketing analysis relating to user location data and redemption data for users within specified locations and specified proximity ranges to retail centers and competitor-retail centers, as well as other external data, such as data relating to non-coupon transactions, inventory turnover, market conditions, cost of raw materials, etc. In one example, redemption data indicates a 60% coupon redemption rate for users located within a 1 to 2 mile radius of a retail center and a 5% redemption rate for users located within a 2.1 to 3 mile radius of the retail center. The coupon packages may be adjusted by the coupon issuer to increase the incentive offered to the users in the 2.1 to 3 mile radius.

Further, another implementation incorporates pre-established responses to redemption data and/or marketing analysis to adjust a customized promotion. Such pre-established responses are set when the customized promotion is initially created or at some later time. Such a system would not require input or manual analysis by personnel. This minimizes labor intensive marketing activities and results in a highly efficient system for use in a corporate marketing and promotional strategy, particularly where numerous fine adjustments to promotions can have a substantial impact on redemption rates.

For example, redemption data for a product is compared against location data of non-coupon purchasers of the product obtained at the product checkout or by survey or any other means. The marketing data indicates that in a 1 to 2 mile radius of a retail center a promotion results in a 3% increase in gross sales which when coupon redemption is factored results in only a 2% increase in net sales, while in the 2.1 to 3 mile radius, the promotion results in an 11% increase in gross sales at an increased marketing cost of only 1% of the cost of goods sold. Consequently, the incentive to users in the 1 to 2 mile radius may be discontinued, increased or otherwise adjusted, either manually based on a review by personnel or automatically based on predetermined parameters programmed into the system which modify the incentive data using marketing feedback or other collected data.

Thus, the analysis means generates a number of differing coupon data packages for transmittal to the online service provider 2. The analysis means also provides specific mapping information which will instruct the online service provider as to which user should be provided with which package(s). For example, user 1 may be mapped to coupon data packages 2 and 3; user no. 2 to packages 3 and 6, etc. This mapping function may be carried out by the coupon distributor and provided to the online service provider at regular intervals, e.g. once per week. Thus, the coupon selection, printing and redemption habits may be analyzed over a time period and used to determine the subsequent targeted packages.

In addition to mapping certain coupon data packages to certain users, certain advertising packages may be mapped to the users in a similar fashion.

In accordance with the present invention, the marketing analysis, coupon packaging, and coupon package distribution functions carried out by the coupon distributor 16 may be carried out at the central data repository, i.e. Internet web site. Further, the coupon redemption and user redemption information processing functions individually carried out by the coupon redemption center 13 and the individual retail stores 10 may be combined into a single redemption center, as shown by the dotted line in FIG. 1. The physical layout of the functions within the system of the present invention is a matter of practicality and choice of the systems designer and does not impact the utility of the present invention.

Figure 7:
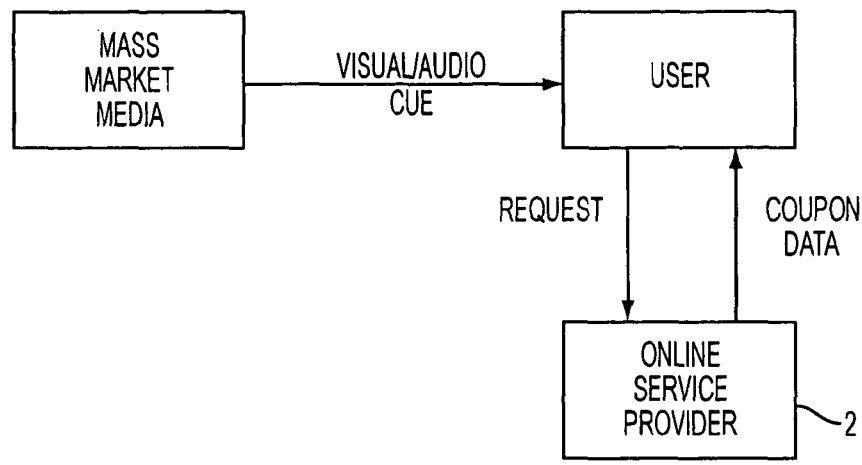
FIG. 7 is a diagram of the use of an external cue to prompt access by the user of the system.

In an alternative embodiment of the present invention, the user is provided with a visual or auditory stimulus or cue to suggest an access of the electronic coupon distribution system. Referring to FIG. 7, a message or logo may be included along with the advertising material normally provided on television, in the newspapers, and the like. This will indicate to a user that he should access the online service provider 2 in order to obtain coupon data related to the advertised product. The availability of the coupon could be time-sensitive, which would provide further incentive to the user to use the system in a prompt and efficient manner. When the radio media is used, a tonal or spoken cue may be included during the advertising message to accomplish the same result.

The amount of redemption discount included with a coupon downloaded to a user may be varied depending on certain demographic information that the system has about the user. For instance, the system may provide a certain value for known users of a brand (which information it will obtain by demographic inquiry or through previous redemptions in the system), and it may provider a higher discount in order to provide an incentive to users of a competitive brand. The ability to vary the value of a discount offer in accordance with such demographic and usage data is a unique advantage offered by the system of the present invention and heretofore unavailable in the prior art.

Referring to FIG. 8, an alternative means of communication between the online service provider 2 or the coupon distributor 16 and the remote computer 6 is illustrated. A satellite communications apparatus 94 is advantageously used to provide a wireless data link 4. In this embodiment, the data communications interface 20 is a satellite antenna dish or other transceiver unit which provides operative communication between the remote computer 6 and the satellite 94. A similar unit is located at the online service provider 2 in order for full wireless data communications to be achieved.

The flowchart of FIG. 9 illustrates the flow of information in the system of the present invention. The information flow illustrated therein has been described in detail in connection with the implementing system.

In a further alternative embodiment of the present invention, the functions of the online service provider 2 are carried out at a site on the Internet. That is, a user may access the incentive data repository by accessing an appropriate Internet site. In this embodiment, the downloaded coupon management routines are encoded with a unique user identification number, which may be for example the user's e-mail Internet address. When the user requests incentive data packages to be transmitted, the user identification number is encrypted and sent to the Internet site along with the request. Appropriate routines are implemented at the Internet site to decrypt the user's identification number and compare it against a list of valid members in order to ensure the validity of the user.

In another alternative embodiment of the present invention, all incentive data management functions are carried out by the online service provider 2 rather than by the offline coupon data management routines 32. In this case, the speed of access of the online service provider 2 must be high, for example on the order of 28.8 kbps. When high speed communications are used, the need for offline data manipulation is eliminated and all processing can be carried out in an efficient manner while connected to the online provider 2.

Figure 11:
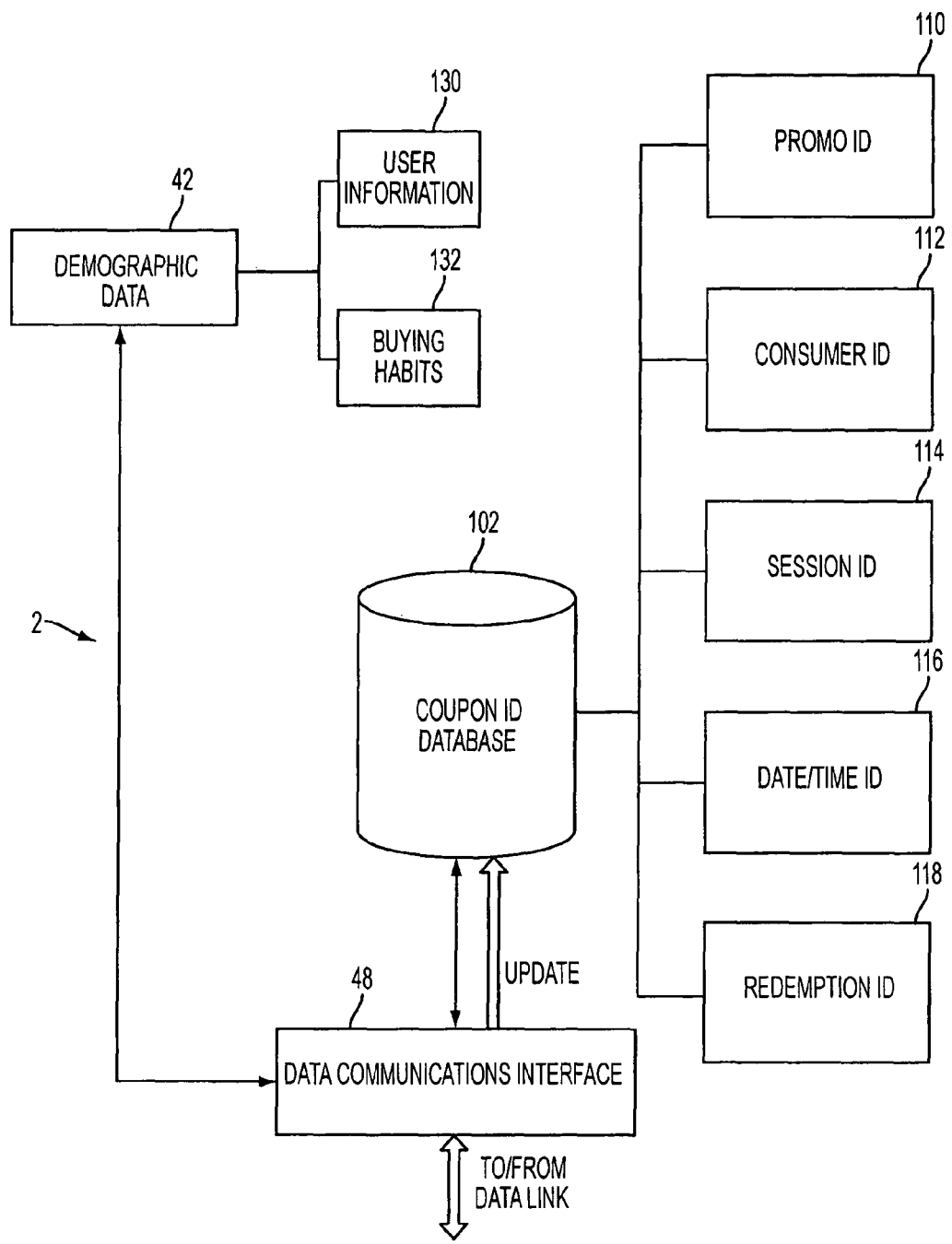
FIG. 11 is a schematic block diagram illustrating a coupon identification database of another embodiment of the present invention.

FIG. 11 illustrates a coupon identification database of the online service provider 2 according to another embodiment of the present invention. Coupon Id Database 102 may be used in conjunction with the files and data described in FIG. 6 (discussed above). Coupon Id Database 102 may include one or more of the following types of data associated with one another (e.g., through data tables or another type of system): Promotional Id 110, Consumer Id 112, Session Id 114, Date/Time Id 116, Redemption Id 118, and other information. Coupon Id Database 102 communicates with the user via the data communications interface 48. Coupon Id may also refer to incentives, rebates, sales notification and other material.

When a user selects a desired coupon (or other incentive), the user may request a print out, an electronic copy of the coupon, or other modes of receiving the selected coupon. A unique identification coupon id may be associated with each coupon. For example, if the user requests a hard copy of the coupon, a unique identification coupon id may be encoded on the coupon.

The unique coupon id may be in the form of symbols of other identifying marks, such as a bar code, a series of numbers and/or letters or any combination thereof or other method that indicates a unique coupon id. A coupon is dispensed to the user when the user selects a desired coupon and requests a print out, an electronic copy, or other form of the coupon. When a coupon is dispensed to a user, the unique Coupon Id is also recorded in Coupon ID Database 102 comprising a plurality of data tables, for example. For each coupon dispensed, online service provider 2 may store to Coupon ID Database 102 content into the various data tables Promotion Id 110, Consumer Id 112, Session Id 114, Date/Time Id 116, Redemption Id 118, and other information associated with the coupon, manufacturer, and/or user associated with the unique Coupon Id. At least one of the data tables associates each Coupon Id with one or more of a Promotion Id and a Consumer Id. Preferably, the Coupon Id is also associated in a data table with a Session Id and information regarding the date/time of printing.

Promotion Id 110 may include coupon/incentive information, such as the item description (including model and manufacturer), the amount of discount, the original retail price, issuer information, expiration date, issue date, restrictions (e.g., buy 3, get one free), method of distribution, eligibility, and other information. Consumer Id 112 may include the consumer's unique identifier which may be associated with demographic information submitted by the consumer. Session Id 114 may include information regarding the user's online experience, such as when the user was online, from what site the user selected the particular coupon, the user's connection speed, the user's ISP provider, the hardware/software used to establish the connection (e.g., PDA, phone, PC, etc.) and other information. Date/Time Id 116 may include the date, day of the week, time and other information related to the user's selecting and printing process. Redemption Id may be updated when the user redeems the selected coupon. This information may include from what store and branch location the user redeemed the coupon, when the user redeemed the coupon, and other information related to the redemption process.

Demographic data 42 may include information related to the user's personal information, buying habits, and other information. Consumer Id 112 may be used to associate demographic data related to a particular consumer. User information 130 may include the user's residence information (e.g., address, whether the user rents or owns), type of housing (e.g., townhouse, apartment, condominium, stand alone house, etc.), income, interests (or hobbies), user status (e.g., single, married, divorced), household information (e.g., whether the user has children, how many, the age/gender of each child), ethnic background, pets, and other personal information. Buying habits 132 may include information regarding the user's purchases, such as items purchased, selected stores, selected brands, user loyalty to a particular brand or store, coupons frequently used, redemption rate, and other information This information may be gathered through the redemption process (e.g., what coupons were redeemed by the user) or other sources.

Coupon distributor 16, Coupon Issuer 14 and other authorized entities may utilize Coupon Id data to track a consumer's purchases, track a particular coupon, track the sales of a particular item or line of items. Coupon Id data may also be used to target a specific customer or group of customers. Coupon Id data further provides advanced security features. Not only may the unique coupon id prevent duplication of the downloaded coupon, but the Coupon Id data provides specific information including consumer id, session id, date/time id and other identifying information. Detailed information also provides the ability to verify actual sales and redemption.

Figure 12:
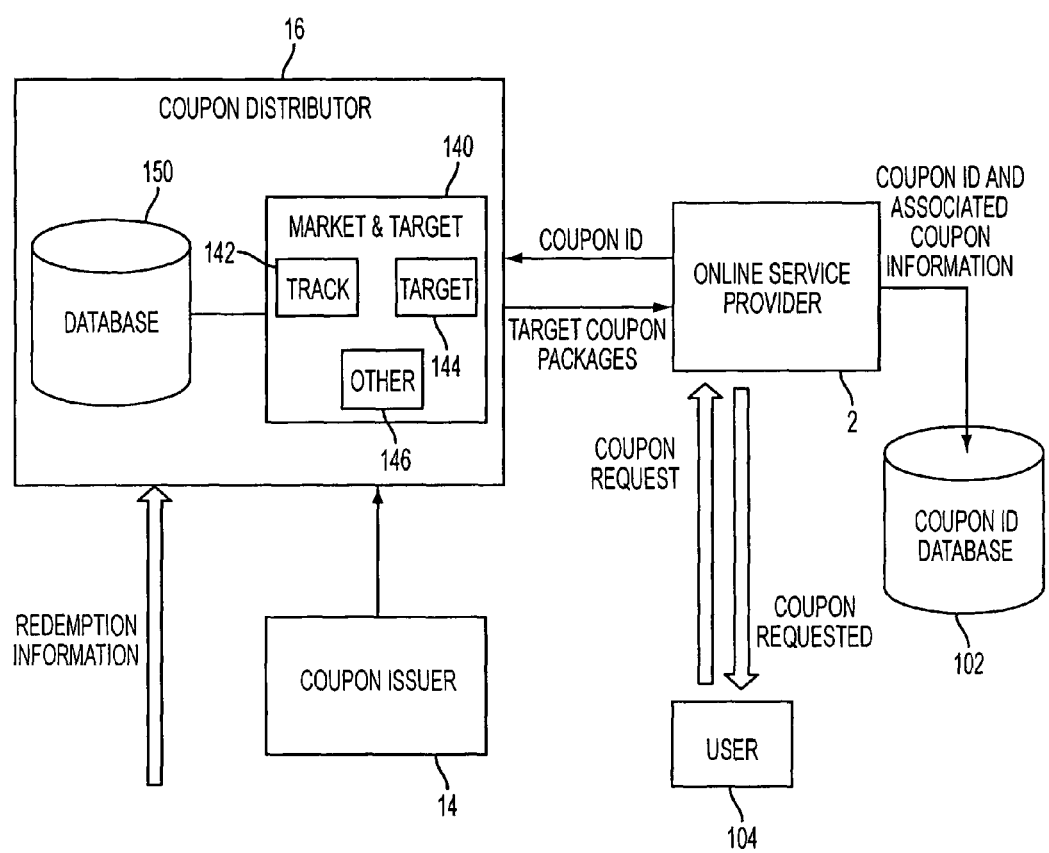
FIG. 12 is a schematic block diagram of the implementation of coupon identification data of another embodiment system of the present invention.

FIG. 12 illustrates an implementation of unique coupon identification data according to an embodiment of the present invention. A user 104 may request a coupon from Online Service Provider 2. Upon dispensing the coupon requested, unique coupon identification data is stored in Coupon Id Database 102, as detailed in FIG. 11. The Coupon Distributor 16 (or Coupon Issuer 14 through Coupon Distributor 16) may request coupon identification data from Online Service Provider 2. Relevant Coupon Id data, demographic data, and other information may be stored and sorted accordingly in database 150 associated with Coupon Distributor 16. Redemption information received from the redemption facilities may also be stored in database 150.

For example, coupon distributor 16 may desire to track the redemption of a coupon for a particular item through Track module 142. Coupon distributor 16 may also desire to track items selected by a particular customer and/or the items redeemed by a particular customer. This information may be used to determine consumer buying habits, sales data for particular items or lines of items, and other information.

In another example, coupon distributor 16 may request coupon identification data to target users through Target module 144. A coupon distributor or coupon issuer may segment coupon id data to target a particular individual or groups of individuals. A particular individual may be targeted by using a specific consumer id. A group of consumers may be targeted by dividing customers by characteristics, such as buying habits and demographics. For example, a coupon distributor may want to target consumers who own dogs and purchase a particular brand of dog food to try a new and improved line of the same dog food. In another example, it may become evident that a particular consumer is in the habit of buying items in bulk. A coupon distributor may then target that particular consumer (through the consumer id) and offer coupons that reward bulk purchases. For example, that consumer may be offered a coupon for $1.50 off of 5 rolls of paper towels or a coupon for a free shampoo when 3 shampoos of a particular brand are purchased. In addition, advertisements, promotions, and other marketing strategies may also be targeted to a particular consumer or group of consumers based on coupon id data, demographic data and other information. Other variations exist.

Figure 13:
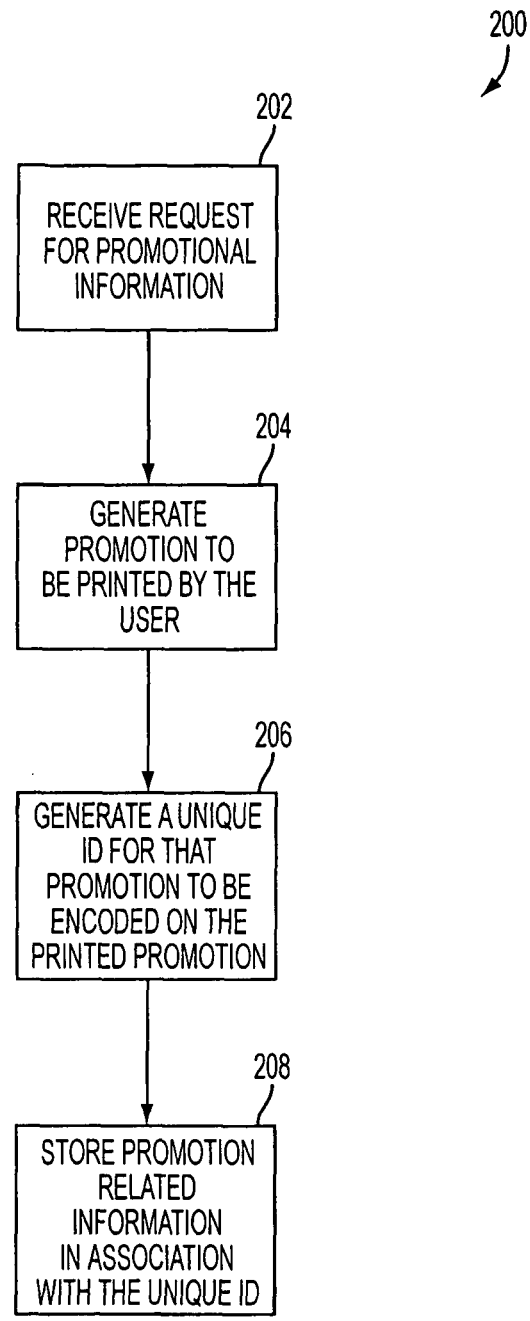
FIG. 13 is a flowchart of a method for generating promotions with a unique identifier according to another embodiment of the present invention.

FIG. 13 illustrates a flowchart of a method 200 for generating promotions with a unique identifier according to another embodiment of the present invention. In step 202, a processing system (e.g., an online service provider or other coupon service provider) may receive a request for promotional information from a user. Promotional information may include coupons, rebates, free samples, sales notification and other information. At step 204, the processing system may generate a promotion to be printed by the user. The user may download the promotion, print the promotion to obtain a hard copy, generate an electronic version of the promotion, or obtain another form of the promotion. At step 206, a unique identifier for that particular promotion may be encoded on the promotion when the promotion is printed or otherwise obtained by the user. At step 208, promotion related information associated with the unique identifier is stored in a database. This information stored in the database may be available to a coupon distributor, coupon issuer or other authorized entity for tracking, targeting and security purposes as well as other features.

According to an embodiment of the invention, the amount of redemption discount included with a coupon downloaded to a user may be varied depending on certain user location data that the system has about the user. For instance, the system may provide a certain value for users located within a 1 mile radius of a retail center (which information it will obtain by inquiry, through previous redemptions in the system, or through any other means), and it may provide a higher value in order to provide an incentive to users located within a range of 1 to 2 miles of the retail center. The ability to vary the value of a discount offer in accordance with such user location data is a unique advantage offered by the system of the present invention and heretofore unavailable. In particular, the advantages of the system include the ability to allow a marketer of a product to maximize or optimize the value of a promotion. Value to a user may also be maximized by associating an incentive with the user's location. Another advantage involves the ability to cross-market products to consumers in a specific area, such as offering a customized incentive that involves the purchase of different products from different marketers, for example, an offer for automobile repair work which includes a discount on a meal at a local restaurant or a discount on gasoline at a local gas station.

The amount of redemption discount included with a coupon downloaded to a user may be varied depending on competitor parameters or competitor data which is stored in the system or which the system can receive or retrieve. The amount of redemption discount included with a coupon downloaded to a user may also be varied depending upon a combination of factors including the combination of user location data and competitor parameters or data. As shown in the Figures, a coupon issuer 14 accesses a coupon distributor 16 through an online server 2 and inputs various data, including a predetermined proximity range and competitor parameters corresponding to each specific incentive offer for a product.

Figure 14:
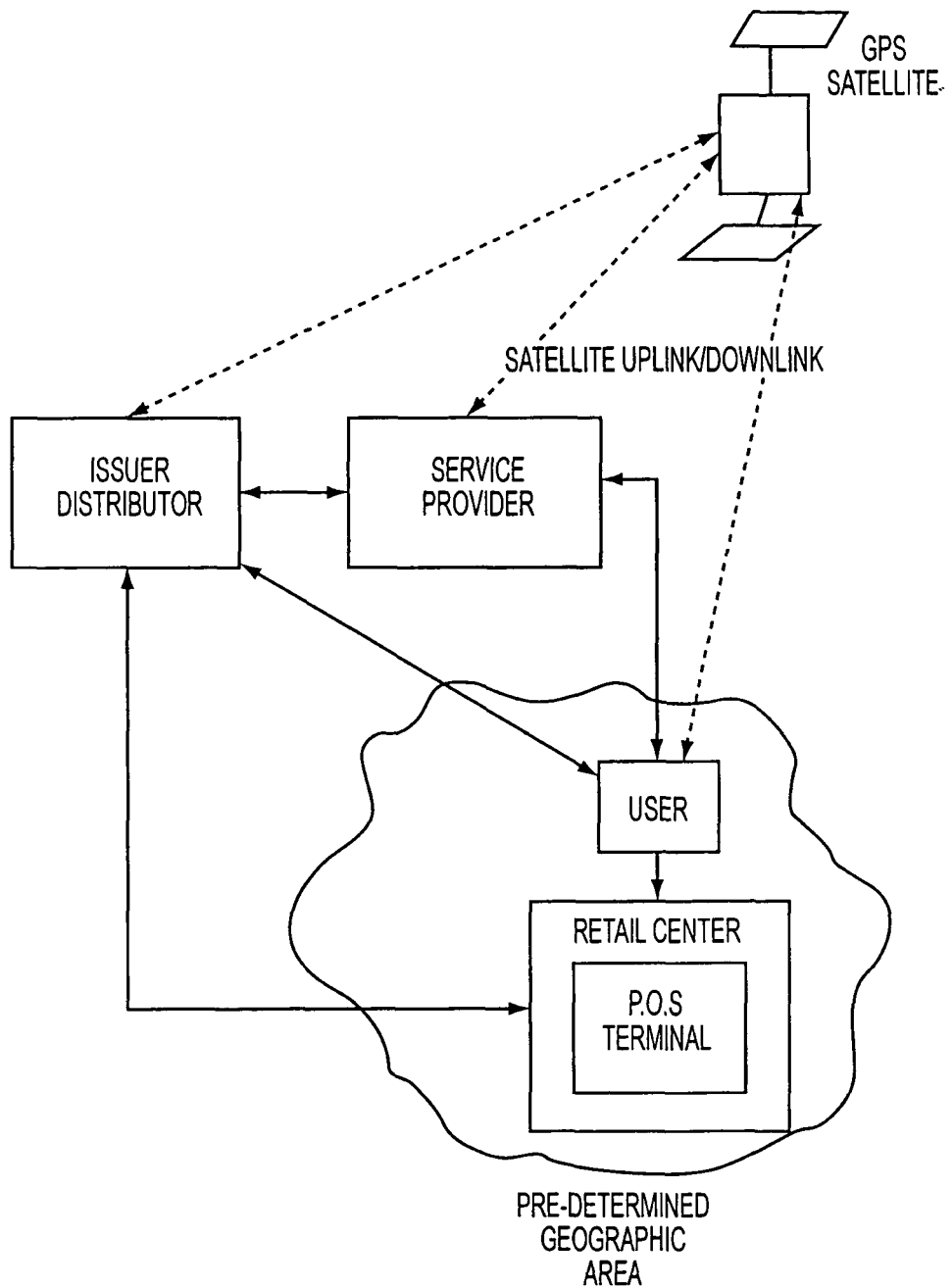
FIG. 14 is a schematic block diagram of a system and method for providing real time directions to a remote user computer according to a remote user computer's proximity to a retail center or a predetermined geographic area according to another embodiment of the present invention.

Referring to the block diagrams of FIG. 1 and of FIG. 14, a system and method for providing real time directions to a remote user computer according to a remote user computer's proximity to a retail center or a predetermined geographic area according to another embodiment of the present invention is illustrated.

Figure 15:
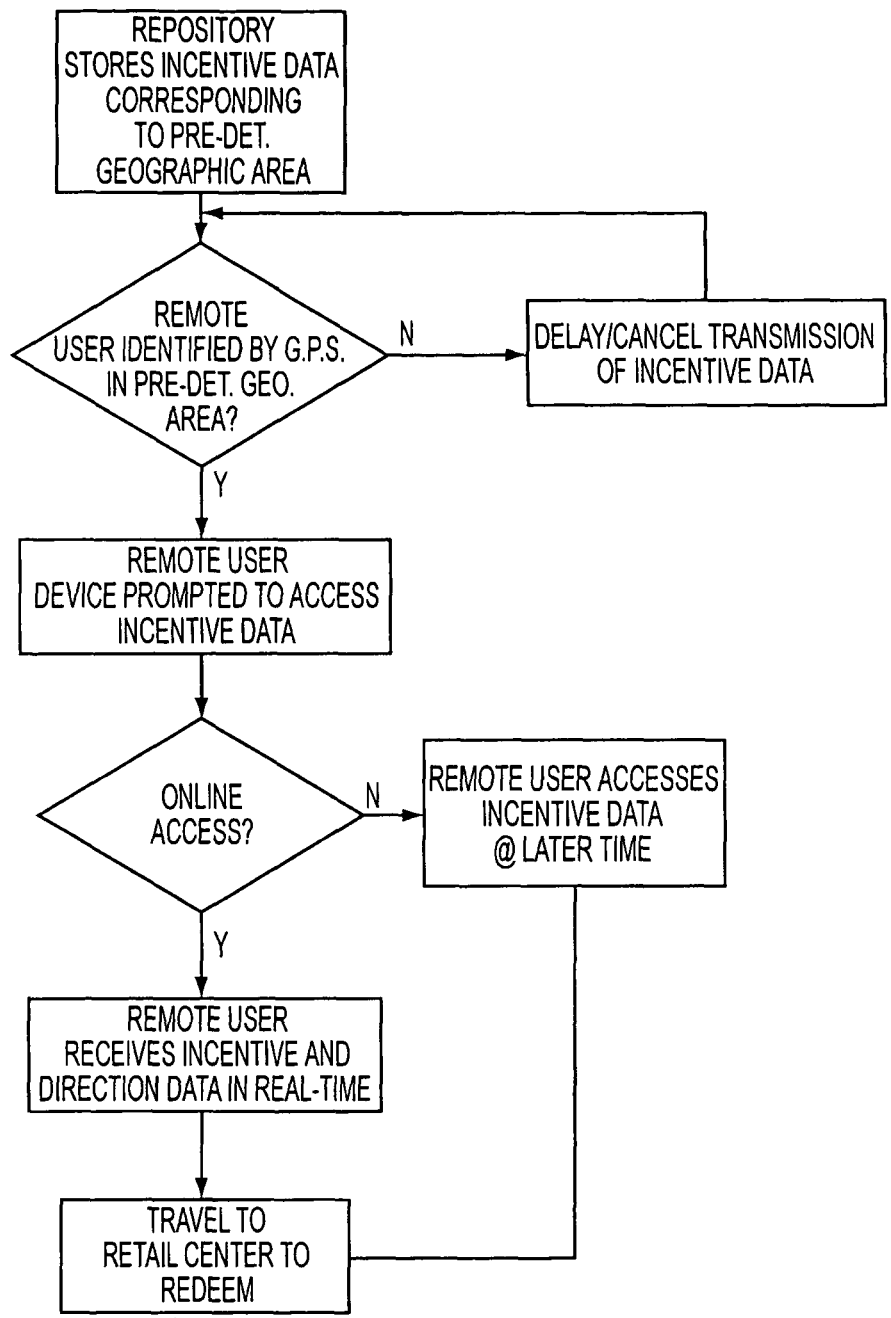
FIG. 15 is a flowchart of a system and method for providing real time directions to a remote user computer according to a remote user computer's proximity to a retail center or a predetermined geographic area according to another embodiment of the present invention.

Referring to FIG. 15, a flowchart of a system and method for providing real time directions to a remote user computer according to a remote user computer's proximity to a retail center or a predetermined geographic area according to another embodiment of the present invention is illustrated.

Optionally, the coupon issuer, upon accessing the online server with a computer, or any server interface means, is presented with a menu displaying various options, including an option to create a proximity-based customized product promotion. The coupon issuer, upon selecting this option, is prompted to enter various data, including product data, an offer description, a minimum and a maximum proximity range, and competitor parameter data, including a value representing a maximum radius around each remote user computer and a number of competitor-retail centers within each such maximum radius of each remote user computer, as described above.

Figure 16A:
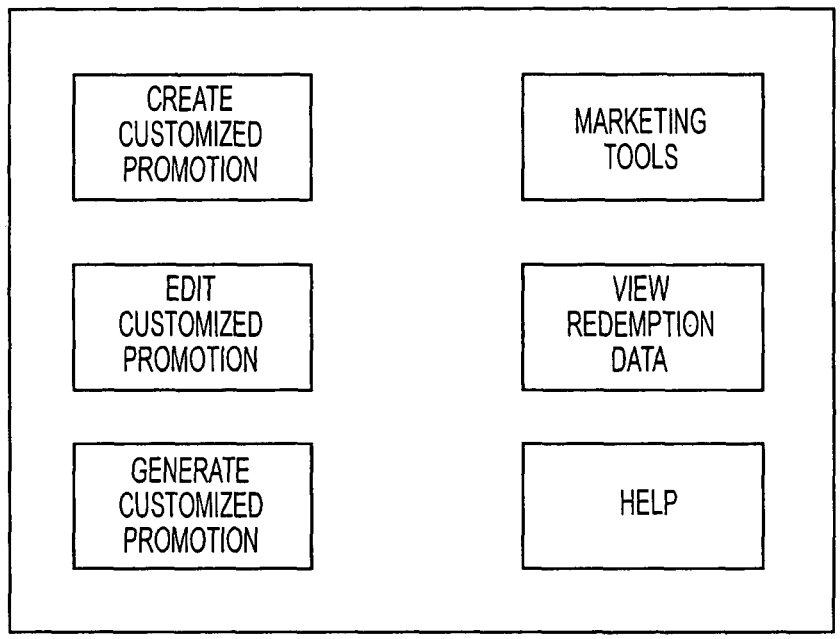
FIGS. 16A and 16B are each a pictorial representation of a display screen accessed by a coupon issuer to create, edit or generate customized incentives in another embodiment of the present invention.
Figure 16B:
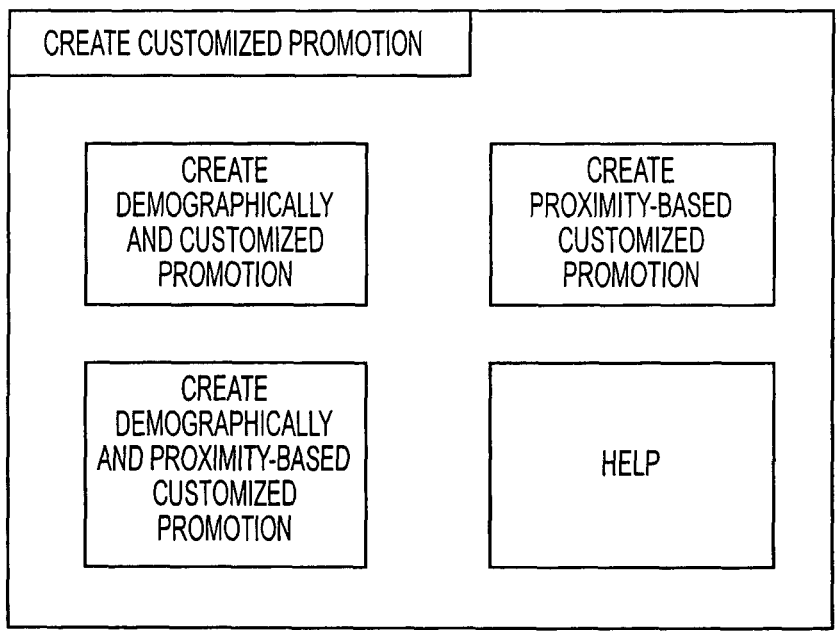

Referring to FIGS. 16A and 16B, the generation of a proximity-based customized promotion is illustrated. As shown in the Figures, the coupon issuer, upon accessing the online server with a computer, or any server interface means, is presented with a menu displaying various options, including an option to create a proximity-based customized product promotion. The coupon issuer, upon selecting this option, is prompted to enter various data, including product data, an offer description, a minimum and a maximum proximity range, and competitor parameter data, including a value representing a maximum radius around each remote user computer and a number of competitor-retail centers within each such maximum radius of each remote user computer, as described above.

When the coupon distribution system involves a plurality of retail centers, a predetermined proximity limitation may be provided by the coupon issuer to denote a maximum radius from each retail center of a plurality of retail centers. Remote user computers located within the maximum radius are associated with that retail center for the purpose of subsequent association with predetermined proximity ranges and competitor parameters. Alternatively, each retail center of a plurality of retail centers is assigned a predetermined geographic area with which user location data is associated by any means available to persons of ordinary skill in the art.

User demographic data, including user location data, from each user is associated with a predetermined proximity limitation and a predetermined competitor parameter by any association means known to persons of ordinary skill in the art. Distances and radii around set points may likewise be determined by any manner known to persons of skill in the art. For example, an internal map may be used to associate a user location with a particular distance from a set point (e.g., a point of sale, retail center, etc.) and that distance may be compared to the maximum and minimum distance values, a range of distance values, mean distance values, or median distance values, for the predetermined proximity ranges. In this manner, each user is associated with the incentive data intended for that user based on the user's location, and particularly the user's location in reference to a specific retail center and a number of competitor-retail centers. Accordingly, the incentive data may thus be downloaded by the user intended by the coupon issuer to receive such data.

Further, the incentive data optionally contains tracking means to track redemption rates and obtain other marketing feedback data for users in specific predetermined proximity ranges and/or competitor parameters, such as a unique identifier which may be detected at a product checkout and stored in a database of a coupon distributor, coupon issuer or online service provider. Redemption rates and other marketing feedback data may be used to generate subsequent promotions or to modify incentive data for a certain category or categories of users.

The incentive data may be in the form of a customized coupon for distribution to a remote user computer. In a preferred embodiment, the customized coupon comprises: a medium for storing or displaying incentive data, said incentive data being customized according to a predetermined proximity range or a predetermined geographic area. Optionally, the incentive data is further customized according to a competitor parameter. Any medium for storing or displaying the product data may be used. Non-limiting exemplary media for storing or displaying the product data, include, without limitation, a cellulose-based medium, an electronic medium, or combinations thereof. The customized coupon may further comprise a unique identifier corresponding to the remote user computer and/or an identifier for associating the incentive data with the predetermined proximity range or the predetermined geographic area.

Another implementation of the invention includes a method of using the system of the invention, including a method for preparing a customized coupon, comprising: (a) selecting incentive data targeted to any user located in a predetermined proximity range or a predetermined geographic area; and (b) identifying the incentive data with indicia unique to the predetermined proximity range or the predetermined geographic location. A customized coupon prepared in this manner may be subsequently associated by any means with the user located in the predetermined proximity range or predetermined geographic area for transmission by any means to that user.

In another implementation of the invention, an incentive for a consumer may be generated according to the general formula: $I_{Ux}=P_{Rn}$ when $L_n > x > L_{n-1}$. In this implementation, an incentive, I, is provided to a remote user computer, designated as Ux, wherein x identifies the location of a remote user computer and wherein n is a value ranging from 1 to the maximum number of predetermined regions, each of which said n values defines an outer boundary, $L_n$, of each of a plurality of regions in which the remote user computer may be located, each such region being designated as Rn. In accordance with the general formula of the invention, the incentive I to be generated for remote user computer Ux is determined by associating a predetermined incentive (designated as $P_{Rn}$) corresponding to a specific region Rn, with that remote user computer Ux. This is accomplished by comparing the location x to the geographic boundaries $L_n$ and $L_{n-1}$ for each of the plurality of regions (R1 . . . Rn), and in this manner identifying the region $R_n$ in which the remote user computer Ux is located. Thereby, the remote user computer Ux is associated with the predetermined incentive $P_{Rn}$ corresponding to the region Rn in which remote user computer Ux is identified. Any means may be used for generating the customized incentives in accordance with this implementation of the invention.

The geographic boundary $L_n$ may be defined in any way, including for example, as a certain distance from a predetermined point, a specified radius of a circle around a predetermined point, a line defined by map coordinates, a line forming a symmetrical or non-symmetrical shape mathematically defined according to a distance from a predetermined point, or a combination thereof, without limitation.

In a further implementation of the invention, a competitor parameter may be established to provide additional conditions upon the creation of an incentive for Ux. In this implementation, an incentive may be generated for a consumer according to the general formula: $I_{Ux}=P_{Rn,C}$ when $L_n > x > L_{n-1}$ and y>C. For example, the location of a remote user computer Ux is compared to each geographic boundary $L_n$ and identified as being situated between $L_3$ and $L_{3-1}(L_2)$. In this manner Ux is associated with region $R_3$ which is subsequently associated with $P_{R3}$. Therefore, the incentive provided to a remote user computer located in R3 will be the predetermined incentive designated as $P_{R3}$, provided the conditions of the competitor parameter are satisfied. Each region may be defined in any manner and may cover a geographic area of any size or shape, for example, a region may be defined as having a certain specified distance or radius from the retail center, having a certain population or density, or having specific map coordinates, without limitation.

FIGS. 17A, 17B, 17C and 17D each illustrates various possible scenarios that demonstrate an implementation of the invention. In the examples illustrated by FIGS. 17A, 17B, 17C and 17D, a predetermined incentive $P_{Rn}$ is established for each of the regions R1, R2 and R3 which surround a central point representing the location of a retail center. Further, a competitor parameter is also established. In these examples, the predetermined incentive for R1, which is designated as $P_{R1}$, is a 0% discount for product X. The predetermined incentive for R2, designated as $P_{R2}$ is a 5% discount on Product X. The predetermined incentive for region R3, designated as $P_{R3}$, is a discount of 10% for product X. The competitor parameter is set at C>1 for the region Rn in which the remote user computer is located.

Figure 17A:
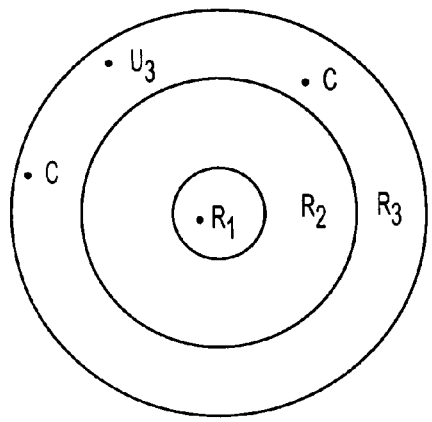
FIGS. 17A, 17B, 17C and 17D are pictorial representations depicting various scenarios involving the proximity-based customization of incentives according to a user's proximity to a retail center in another embodiment of the invention.

Referring to FIG. 17A, a remote user computer U3 is located in region R3. Also located in region R3 are two competitor retail centers. The predetermined incentives and a competitor parameter of C=1 is also established as described above. Therefore, in this example, the remote user computer Ux will be associated with the predetermined incentive designated as $P_{R3}$ which in this case is a 10% discount on product X. As shown in the Figure, the conditions of the competitor parameter are satisfied by the presence of the two competitor retail centers in region R3. Accordingly, the associated predetermined incentive for remote user computers located within region R3 is provided to remote user computer U3.

Figure 17B:
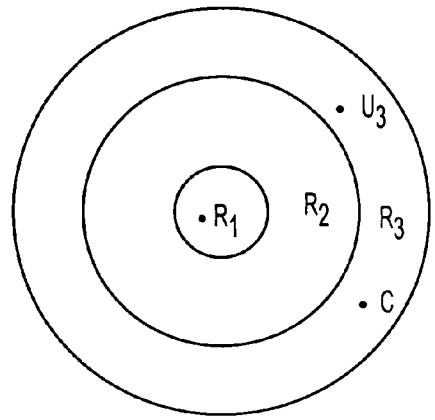

Referring to FIG. 17B, a remote user computer U3 is located in region R3 along with one competitor retail center. In this case, no incentive is provided to remote user computer U3 because the conditions established by the competitor parameter are not satisfied here. The competitor parameter requires the presence of more than one competitor retail center within the region of the remote user computer. In this example, there is only one competitor retail center in region R3.

Figure 17C:
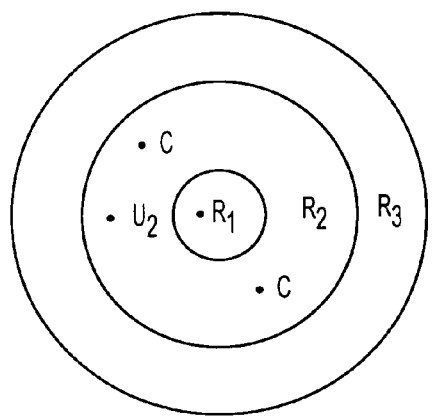

Referring to FIG. 17C, a remote user computer U2 is located in region R2. Also located in region R2 are two competitor retail centers. In accordance with the predetermined incentives for each of the various regions as described above, the remote user computer U2 is associated with a 5% discount, provided that the competitor parameter conditions are satisfied. In this case, there are two competitor retail centers in region R2. Therefore, the conditions of the competitor parameter are satisfied in this case and the predetermined incentive for R2 is provided to U2.

Figure 17D:
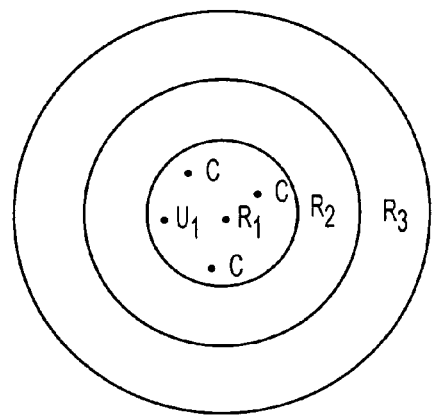

Referring to FIG. 17D, a remote user computer U1 is located in region R1. Also located in region R1 are three competitor retail centers. In this case, although the competitor parameter conditions are satisfied by having three competitor retail centers within the region in question, R1, a 0% discount has been established as the predetermined incentive for that region. Accordingly, remote user computers in region R1 will not be provided any incentive.

Figure 19:
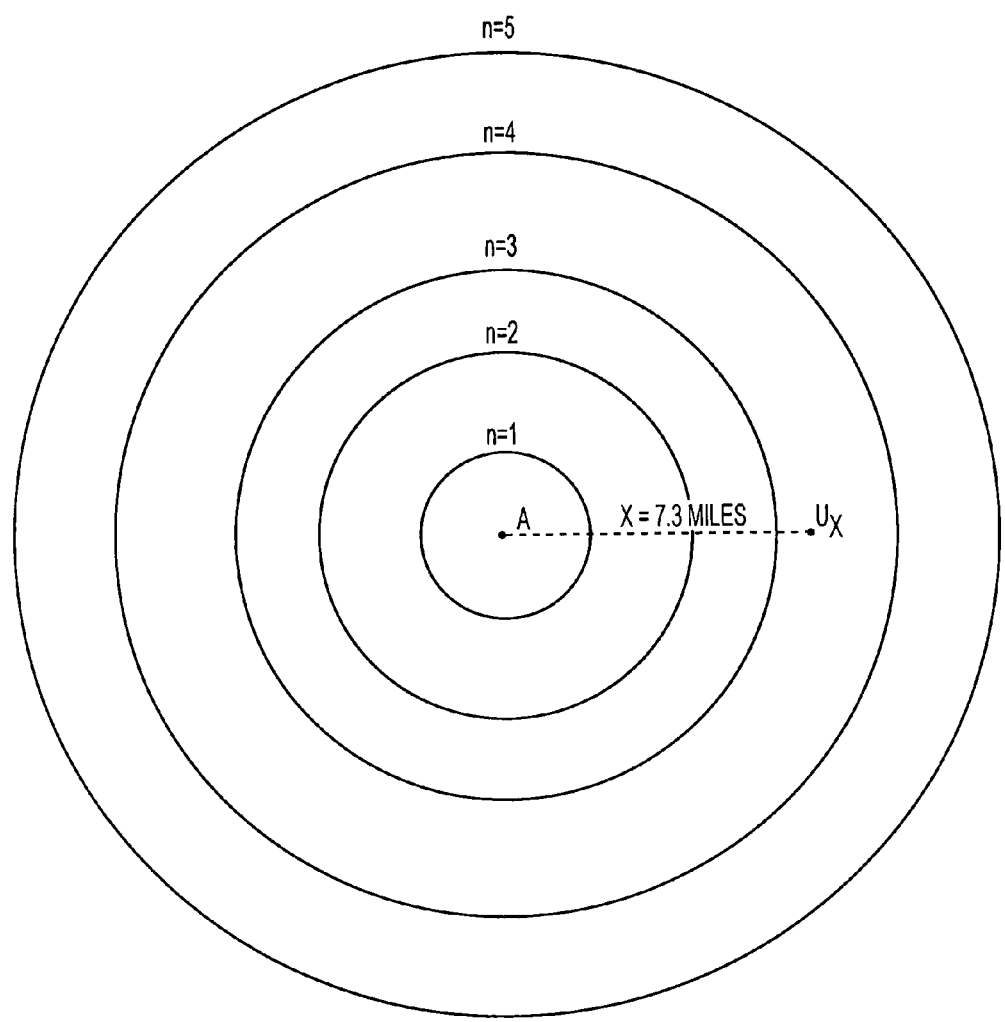
FIG. 19 is a pictorial representation depicting the proximity-based customization of incentives according to the general formula of the invention in another embodiment of the invention.

Referring to FIGS. 18 and 19, the generation of proximity based customized incentives according to the general formula of the invention will be explained. Shown in FIG. 18 is a data table having five columns with the first column being a product identifier, the second column being the store identifier, the third column being the n value, the fourth column being the geographic boundary, which corresponds to a particular n value, and the fifth column being the predetermined incentive corresponding to a particular region as defined by the corresponding n value. In this case, customized incentives are predetermined for a product X to be purchased at a retail center A. Five discrete regions surrounding the retail center A are defined by five circles of differing radii. FIG. 18 shows the radius of each circle under the column labeled $L_n$, the corresponding n value to $L_n$ and the corresponding predetermined incentive for product X at retail center A. The information in the data table may be inputted by the coupon issuer or may be established as the result of marketing feedback data or a combination thereof. The data in the data table may be stored in any manner, provided said data may be accessed for the purpose of associating said data with location data corresponding to a remote user computer. In this manner, the general formula of the invention may be used to generate an incentive for a particular remote user computer by obtaining the location data for that remote user computer and associating that location data with the data in the exemplary data table of FIG. 18, for example without limitation.

Referring to FIG. 19, a remote user computer, Ux is located at a distance of 7.3 miles from the retail center A. In accordance with the general formula of the invention, an incentive may be customized for remote computer user Ux by associating relocation data with the appropriate n value corresponding to a predetermined incentive for the region in which the remote user computer is located. In this case, the X value of 7.3 miles falls between 6 miles and 8 miles as shown on the data table of FIG. 18. Thus, $X<L_4$ and $>L_{4-1}$ ($L_3$). Accordingly, Ux corresponds to an n value of 4 to identify the region in which the remote user computer is located. As shown in the data table of FIG. 18, an n value of 4 corresponds to a 15% discount on product X at retail center A. Accordingly, the incentive provided to the remote user computer Ux is a 15% discount on product X at retail center A. In this example, further conditions can be placed upon the providing of an incentive to the remote user Ux. For example, a competitor parameter is established specifying a minimum number of competitors to be within a predetermined area as a condition precedent to providing the incentive to the remote user computer Ux, without limitation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Optionally, hyperlinks are included in an implementation of the present invention. The use of hyperlinks within an application program interface enables selective, non-intrusive, recall of help functions such as definitions of critical terms located within a textual or graphical interface panel. Elements of a user interface for an application program are predefined as help functions by the programmer or developer. These predefined help functions are then hyperlinked to the specified predefined element. When a user traverses the interface, highlighted elements corresponding to the predefined help functions may be selected by a mouse or mouse-type function. Upon selection of a hyperlinked element, a window appears providing maps, directions, etc., without limitation.

A user may select particular elements of interest by selecting the element using a click of a mouse or equivalent user input function, such as a magnified section of a map, without limitation. The selection of an element retrieves the data desired. The user has the ability to selectively retrieve immediate functionality without having to stray from the interface of the application program itself.

What is claimed is:

1. A computer system for transmitting incentive data to a user device, said computer system comprising:
  a computer processor; and
  associated memory;
  wherein said memory stores data specifying a retail center location of a retail center, a geographical region which surrounds said retail center location, and incentive data, said incentive data associated in said memory with said geographical region;
  wherein said computer system is configured to:
    receive user device location data, indicating user device location of a user device;
    respond to receipt of said user device location data by determining a user device region determination indicating whether said user device location is within said geographical region; and
    respond to said user device region determination by, transmitting after a delay a prompt to download said incentive data to a user device address associated with said user device if said region determination indicates said user device location is not within said geographical region, and transmitting with no delay said prompt to said user device address if said region determination indicates that said user device location is within said geographical region.

2. The system of claim 1, further comprising:
a database, in operative communication with said computer system and storing distance data, time data, mileage data, or combinations thereof; and
wherein said computer system is further configured to associate in said database said distance data, time data, mileage data, or combinations thereof with said user device location and said retail center location.

3. The system of claim 1, wherein said geographic region comprises a plurality of geographically distinct regions each of which surrounds said retail center location and each of which is distinct from one another, and wherein said memory stores a plurality of discount values, and wherein said memory stores an association of each one of said discount values with only one of said geographically distinct regions;
and wherein said user device region determination indicates which one, if any, of said geographically distinct regions in which said user device location resides;
and wherein said computer system is programmed to transmit to said user device address, in response to a prompt from said user device address received at said computer system for said incentive data, data comprising indication of that one of said discount values associated with the geographically distinct region in which said user device location was determined to reside.

4. A computer implemented method for transmitting incentive data to a user device, said method comprising:
storing, in memory of a computer system having a processor and said memory, data specifying a retail center location of a retail center, a geographical region which surrounds said retail center location, and incentive data, said incentive data associated in said memory with said geographical region;
receiving in said computer system user device location data, indicating user device location of a user device;
said processor responding to receipt of said user device location data by determining a user device region determination indicating whether said user device location is within said geographical region;
said processor responding to said user device region determination by, transmitting after a delay a prompt to download said incentive data to a user device address associated with said user device if said region determination indicates said user device location is not within said geographical region, and transmitting with no delay said prompt to said user device address if said region determination indicates that said user device location is within said geographical region.

5. The method of claim 4, further comprising:
storing in said memory distance data, time data, mileage data, or combinations thereof; and
associating in said memory said distance data, time data, mileage data, or combinations thereof said user device location and said retail center location.

6. The method of claim 4, wherein:
said geographic region comprises a plurality of geographically distinct regions each of which surrounds said retail center location and each of which is distinct from one another;
further comprising storing in memory a plurality of discount values, and wherein said memory stores an association of each one of said discount values with only one of said geographically distinct regions;
wherein said user device region determination indicates which one, if any, of said geographically distinct regions in which said user device location resides;
and transmitting from said computer system to said user device address, in response to receipt of a prompt from said user device address received at said computer system for said incentive data, data comprising indication that one of said discount values associated with the geographically distinct region in which said user device location was determined to reside.

* * * * *